United States Patent
Ike et al.

(10) Patent No.: US 10,526,830 B2
(45) Date of Patent: Jan. 7, 2020

(54) DOUBLE OPENING STORAGE DEVICE

(71) Applicants: TOYODA GOSEI CO., LTD., Kiyosu-shi (JP); TOYOTA JIDOSHA KABUSHIKI KAISHA, Toyota-shi (JP)

(72) Inventors: Yasufumi Ike, Nagoya (JP); Yu Hishida, Kiyosu (JP); Yoshinori Noda, Kiyosu (JP); Toshiaki Abe, Handa (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/038,489

(22) Filed: Jul. 18, 2018

(65) Prior Publication Data
US 2019/0063132 A1 Feb. 28, 2019

(30) Foreign Application Priority Data
Aug. 28, 2017 (JP) .................................. 2017-163629

(51) Int. Cl.
*E05D 15/50* (2006.01)
*B60R 11/00* (2006.01)
*B60R 7/04* (2006.01)

(52) U.S. Cl.
CPC .............. *E05D 15/505* (2013.01); *B60R 7/04* (2013.01); *B60R 11/00* (2013.01); *E05D 15/502* (2013.01); *B60R 2011/0007* (2013.01); *E05Y 2900/538* (2013.01)

(58) Field of Classification Search
CPC ........ E05D 15/00–505; B60R 7/00–04; B60R 11/00; B60R 2011/0007

USPC ......................................................... 220/817
See application file for complete search history.

(56) References Cited

U.S. PATENT DOCUMENTS

| 4,473,261 | A | * | 9/1984 | Jungmann | ............... E05D 15/42 217/60 E |
| 4,893,850 | A | * | 1/1990 | Mizusawa | ................. E05C 3/14 292/128 |
| 8,051,688 | B2 |  | 11/2011 | Soma |  |
| 2009/0218842 | A1 | * | 9/2009 | Muller | ...................... B60R 7/04 296/37.13 |
| 2015/0041469 | A1 | * | 2/2015 | Fukumoto | ................. B60R 7/04 220/260 |

(Continued)

FOREIGN PATENT DOCUMENTS

JP         2016-112979 A    6/2016

*Primary Examiner* — Kareen K Thomas
(74) *Attorney, Agent, or Firm* — Posz Law Group, PLC

(57) ABSTRACT

A gap is maintained between: an outer surface of a shaft which is inserted in and removed from a hole of a box body and serves as a rotation shaft; and a hole wall, while axial misalignment of the shaft in the hole is inhibited. In a double opening storage device, a lid has two shafts that extend so as to advance and retract along two rotation shafts. Each shaft has a cut portion which is obtained by a part of a circumferential portion of a leading end portion being cut out and disposed in a lower portion at lid closed position. The box body has two holes, formed in a side wall, corresponding to the two shafts of the lid, and has a projection that projects upward from a lower surface of the hole wall of each hole, and that moves the shaft upward when the lid is opened.

4 Claims, 12 Drawing Sheets

(56) References Cited

U.S. PATENT DOCUMENTS

| | | | |
|---|---|---|---|
| 2016/0023847 A1* | 1/2016 | Guild | B65F 1/1623 |
| | | | 49/386 |
| 2017/0057416 A1* | 3/2017 | Yang | B60R 7/04 |
| 2017/0088060 A1* | 3/2017 | Buza | B60R 7/04 |
| 2017/0096109 A1* | 4/2017 | Thomas | B60R 7/04 |
| 2018/0022281 A1* | 1/2018 | Hatakeyama | B60R 7/04 |
| 2018/0037169 A1* | 2/2018 | Dunham | B60Q 3/225 |

* cited by examiner

A-A When Locking of Right Side Portion is Canceled

A-A When Right Side Portion is Opened

DOUBLE OPENING STORAGE DEVICE

TECHNICAL FIELD

The present invention relates to a double opening storage device that includes a box body, a lid that covers an opening of the box body, and an opening and closing mechanism capable of opening and closing the lid by pivoting the lid about two rotation shafts that extend along the peripheral edge of the opening.

BACKGROUND ART

To date, a double opening storage device such as a console box disposed in a vehicle interior has been known (for example, JP2016112979 (A)). The double opening storage device includes a box body, a lid, and an opening and closing mechanism. The box body has a storage portion having an opening in the upper surface. The lid is formed in a thin rectangular shape so as to correspond to the opening of the box body, and covers the opening so as to be openable and closable. The opening and closing mechanism includes a first opening and closing mechanism and a second opening and closing mechanism. The first opening and closing mechanism is a mechanism for opening and closing the lid by pivoting the lid about a first rotation shaft that extends along a first side (for example, long side on the left side of the vehicle) of the peripheral edge of the opening of the box body. Meanwhile, the second opening and closing mechanism is a mechanism for opening and closing the lid by pivoting the lid about a second rotation shaft that extends along a second side (for example, long side on the right side of the vehicle) that is parallel to the first side of the peripheral edge of the opening of the box body.

The lid has: a lid body; a first shaft that extends so as to advance and retract along the first rotation shaft relative to the lid body; and a second shaft that extents so as to advance and retract along the second rotation shaft relative to the lid body. The box body has: a body portion; a first hole which is formed in a side wall of the body portion and in and from which the first shaft is inserted and removed; and a second hole which is formed in the side wall of the body portion and in and from which the second shaft is inserted and removed. The first opening and closing mechanism opens and closes the lid by pivoting the lid about the first rotation shaft between a closed position and a right side opened position in a state where the first shaft is inserted in the first hole and the second shaft is removed from the second hole. The second opening and closing mechanism opens and closes the lid by pivoting the lid about the second rotation shaft between the closed position and a left side opened position in a state where the first shaft is removed from the first hole and the second shaft is inserted in the second hole. That is, the first shaft serves as a latch pin that allows the first opening and closing mechanism to hold the lid at the closed position and to cancel the holding of the lid at the closed position, and serves also as a rotation shaft when the second opening and closing mechanism opens the lid. Meanwhile, the second shaft serves as a latch pin that allows the second opening and closing mechanism to hold the lid at the closed position and to cancel the holding of the lid at the closed position, and serves also as a rotation shaft when the first opening and closing mechanism opens the lid.

SUMMARY OF INVENTION

Technical Problem

In general, in a structure where a latch pin is inserted in and removed from a hole, the hole needs to be formed so as to be larger than the latch pin, and a gap needs to be formed between the outer surface of the latch pin and a hole wall of the hole in order to, for example, assure easy insertion and removal. As described above, in the double opening storage device, each of the shafts mounted to the lid serves as both the latch pin and the rotation shaft. Therefore, when the shaft rotates as the rotation shaft in a state where the shaft is inserted as the latch pin in the hole while the lid is opened and closed, axial misalignment of the shaft may occur in the hole. Such an axial misalignment causes rubbing against components around the lid, backlash in opening and closing the lid, or the like.

The present invention has been made in view of the aforementioned problem, and an object of the present invention is to provide a double opening storage device that maintains a gap between: an outer surface of a shaft which is inserted in and removed from a hole of a box body and which also serves as a rotation shaft; and a hole wall of the hole, and that simultaneously inhibits axial misalignment of the shaft in the hole.

Solution to Problem

The present invention is directed to a double opening storage device that includes: a box body including a storage portion having an opening in an upper surface; a lid configured to cover the opening so as to be openable and closable; a first opening and closing mechanism configured to open and close the lid by pivoting the lid about a first rotation shaft that extends along a peripheral edge of the opening; and a second opening and closing mechanism configured to open and close the lid by pivoting the lid about a second rotation shaft that extends along the peripheral edge of the opening. The lid has a lid body, a first shaft that extends so as to advance and retract along the first rotation shaft relative to the lid body, and a second shaft that extends so as to advance and retract along the second rotation shaft relative to the lid body. The box body has: a body portion; a first hole formed in a side wall of the body portion such that a dimension of the first hole in an up-down direction is greater than a dimension of the first shaft in the up-down direction, and the first shaft is inserted in and removed from the first hole; and a second hole formed in the side wall of the body portion such that a dimension of the second hole in the up-down direction is greater than a dimension of the second shaft in the up-down direction, and the second shaft is inserted in and removed from the second hole. The first opening and closing mechanism opens and closes the lid between a closed position and a first opened position by pivoting the lid about the first rotation shaft in a state where the first shaft is inserted in the first hole and the second shaft is removed from the second hole. The second opening and closing mechanism opens and closes the lid between the closed position and a second opened position by pivoting the lid about the second rotation shaft in a state where the first shaft is removed from the first hole and the second shaft is inserted in the second hole. The first shaft has a first cut portion obtained by a part of a circumferential portion of a leading end portion being cut out, the first cut portion being disposed in a lower portion at the closed position of the lid. The second shaft has a second cut portion obtained by a part of a circumferential portion of a leading end portion being cut out, the second cut portion being disposed in a lower portion at the closed position of the lid. The box body has: a first projection configured to project upward from a lower surface of a hole wall of the first hole, and to move the first shaft upward in the first hole when the lid is opened from the closed position to the first opened position; and a second projection configured to project upward from a lower surface of a hole wall of the second hole, and to move the second shaft upward in the second hole when the lid is opened from the closed position to the second opened position.

In this configuration, the first hole in which and from which the first shaft is inserted and removed, and the second hole in which and from which the second shaft is inserted and removed, are each formed on the side wall of the box body such that the dimension of the first hole or the second hole in the up-down direction is greater than the dimension of the first shaft or the second shaft in the up-down direction. Furthermore, while the lid is being opened from the closed position toward the opened position, the first shaft or the second shaft that rotates as a rotation shaft, contacts with the projection in the first hole or the second hole and is supported in the first hole or the second hole. Thus, further movement of the first shaft or the second shaft in the first hole or the second hole in the downward direction is regulated. Therefore, while a gap is assuredly formed between: the outer surface of the first shaft that is inserted in and removed from the first hole and that also serves as a rotation shaft when the lid is opened and closed; and the hole wall of the first hole, axial misalignment of the first shaft in the first hole is regulated. Similarly, while a gap is assuredly formed between: the outer surface of the second shaft that is inserted in and removed from the second hole and that also serves as a rotation shaft when the lid is opened and closed; and the hole wall of the second hole, axial misalignment of the second shaft in the second hole is regulated.

DESCRIPTION OF EMBODIMENTS

Hereinafter, an embodiment of a double opening storage device according to the present invention will be specifically described with reference to the drawings.

Figure 1:
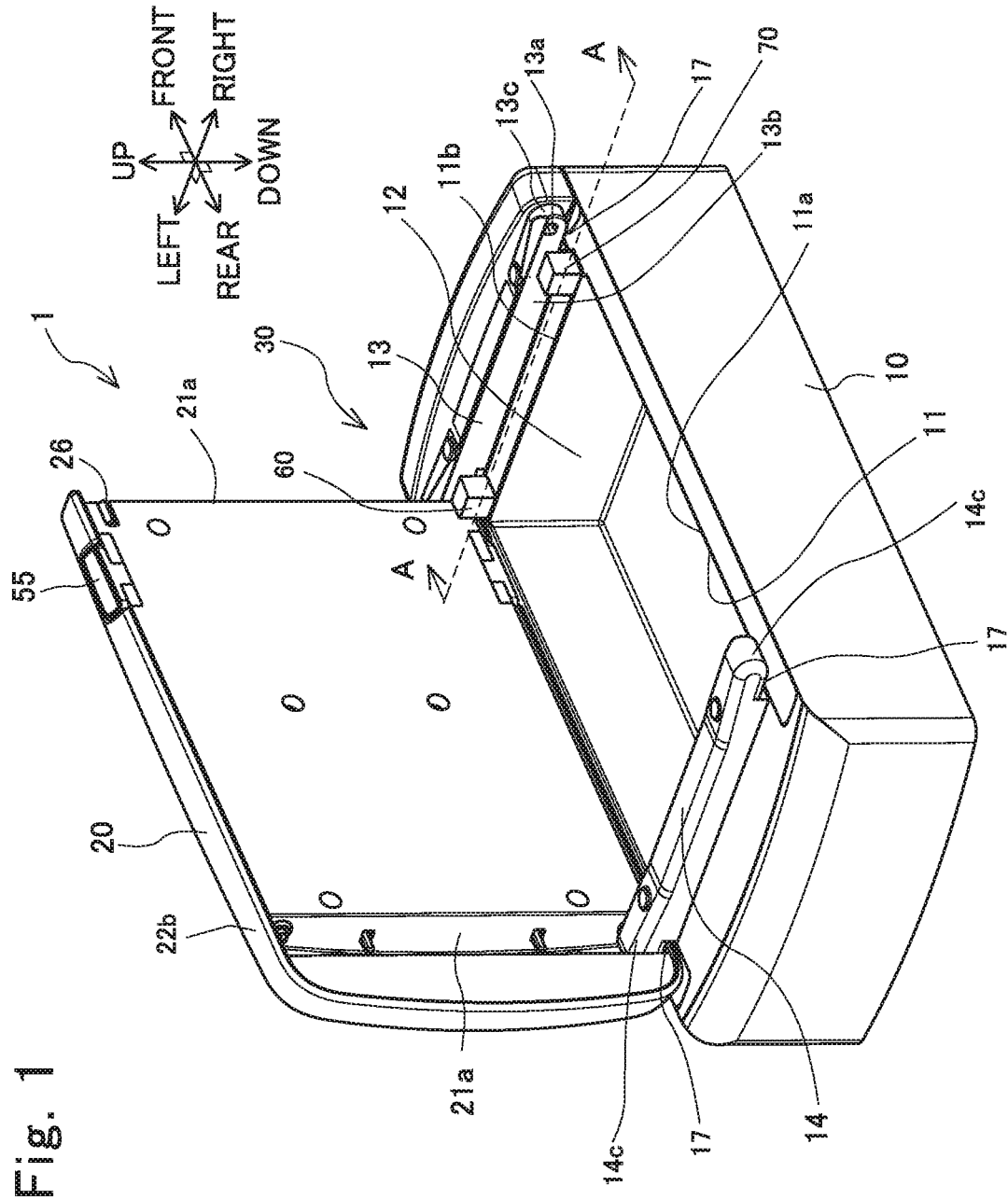
FIG. 1 is a perspective view of a double opening storage device at a right-side fully-opened position according to one embodiment of the present invention.

A double opening storage device 1 according to the present embodiment is, for example, a console box mounted to a center console disposed in a vehicle interior. The double opening storage device 1 includes a box body 10, a lid 20, and an opening and closing mechanism 30, as shown in FIG. 1. The double opening storage device 1 is structured such that the lid 20 is openable and closable relative to the box body 10 by the opening and closing mechanism 30. The double opening storage device 1 may be used as an arm rest on which an arm of a person in the vehicle is placed when the lid 20 is at a closed position.

The box body 10 is shaped in an almost rectangular parallelepiped. The box body 10 has a storage portion 12 having a rectangular opening 11 in the upper surface. The opening 11 has two long sides 11a and two short sides 11b on the peripheral edge of the opening 11. Each long side 11a extends in the front-rear direction of the vehicle. Each short side 11b extends in the direction orthogonal to the long side 11a, that is, in the left-right direction of the vehicle. That is, the double opening storage device 1 is disposed such that the long sides 11a extend in the front-rear direction of the vehicle and the short sides 11b extend in the left-right direction of the vehicle. Hereinafter, when a direction such as the front-rear direction of the vehicle and the left-right direction of the vehicle, or a position or a portion of each component of, for example, an object, is indicated, the term "vehicle" may not be used. For example, the front-rear direction of the vehicle may be simply referred to as front-rear direction, and the left-right direction of the vehicle may be simply referred to as left-right direction.

Figure 2:
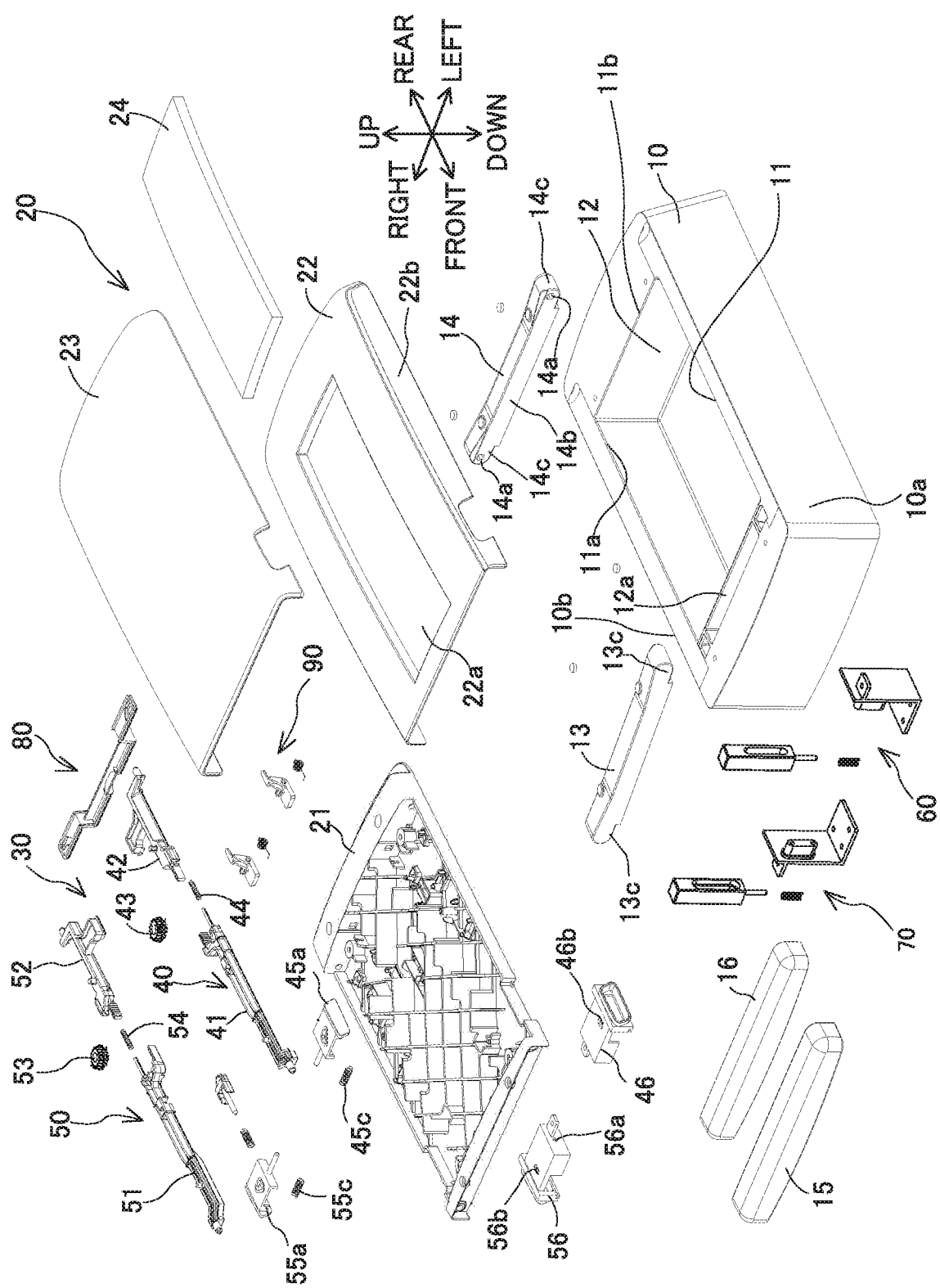
FIG. 2 is an exploded perspective view of the double opening storage device according to the present embodiment.

The box body 10 has a front side member 13 fixed to the front side peripheral edge of the storage portion 12, and a rear side member 14 fixed to the rear side peripheral edge of the storage portion 12, as shown in FIG. 2. The front side member 13 and the rear side member 14 each have a long shape, and are disposed such that the longitudinal direction of each of the front side member 13 and the rear side member 14 is parallel to the left-right direction. To the front side member 13, a cover 16 covered by a surface sheath 15 is fitted. A pocket portion 12a is adjacently formed in front of the storage portion 12 of the box body 10.

The front side member 13 has fixing holes 13a. The fixing holes 13a are formed in both left and right end portions, respectively, of a side wall 13b that faces the storage portion 12. The rear side member 14 has fixing holes 14a. The fixing holes 14a are formed in both left and right end portions, respectively, of a side wall 14b that faces the storage portion 12. The front side member 13 has protrusions 13c. The rear side member 14 has protrusions 14c. The protrusions 13c are provided on both the left and the right sides of the front side member 13, and protrude in the left direction and the right direction. The protrusions 14c are provided on both the left and the right sides of the rear side member 14, and protrude in the left direction and the right direction. Gaps 17 are formed between the respective protrusions 13c of the front side member 13 and the surface of the storage portion 12 of the box body 10. Gaps 17 are formed between the respective protrusions 14c of the rear side member 14 and the surface of the storage portion 12 of the box body 10.

The lid 20 is formed in a thin rectangular shape so as to correspond to the opening 11 of the box body 10. The lid 20 covers the opening 11 so as to be openable and closable. The lid 20 is openable and closable by pivoting about the rotation shaft that extends along one of the long sides 11a on the peripheral edge of the opening 11, from a closed position at which the opening 11 is covered, and the lid 20 is openable and closable by pivoting about the rotation shaft that extends along the other of the long sides 11a on the peripheral edge of the opening 11, from the closed position at which the opening 11 is covered. The lid 20 is openable, relative to the box body 10, from both the left side and the right side closed positions, to a fully-opened position at a predetermined angle (for example, 100°).

The lid 20 has a lower lid member 21, an upper lid member 22, a surface sheath 23, and a cushion member 24, as shown in FIG. 2. In the upper surface of the upper lid member 22, a recess 22a is formed. The cushion member 24 is fitted into the recess 22a. The upper lid member 22 and the cushion member 24 are covered by the surface sheath 23. The upper lid member 22 is attached to the lower lid member 21 by screws.

Recesses 21a are formed on the front side and the rear side, respectively, of the lower lid member 21. The recesses 21a are storage portions in which the front side member 13 and the rear side member 14 fixed to the peripheral edge of the storage portion 12 of the box body 10 are stored. Both the left and the right side portions of each recess 21a are surrounded by a side wall 22b of the upper lid member 22. When the lid 20 is opened, the side wall 22b is inserted into the gap 17 between the surface of the storage portion 12 of the box body 10 and the protrusion 13c, 14c of the front side member 13 or the rear side member 14. When the lid 20 has been fully opened, the side wall 22b is engaged with and stopped by the protrusion 13c, 14c of the front side member 13 or the rear side member 14, whereby the opening degree of the lid 20 is prevented from further increasing. The protrusion 13c, 14c has a stopper function for preventing the lid 20 from tilting in the opening direction.

The opening and closing mechanism 30 has a left side opening and closing mechanism 40 and a right side opening and closing mechanism 50. The left side opening and closing mechanism 40 is a device that holds the left side portion of the lid 20 at the closed position and also cancels the holding to open the left side portion of the lid 20. The left side opening and closing mechanism 40 is provided on the left side of the lid 20. The right side opening and closing mechanism 50 is a device that holds the right side portion of the lid 20 at the closed position and also cancels the holding to open the right side portion of the lid 20. The right side opening and closing mechanism 50 is provided on the right side of the lid 20.

Figure 3:
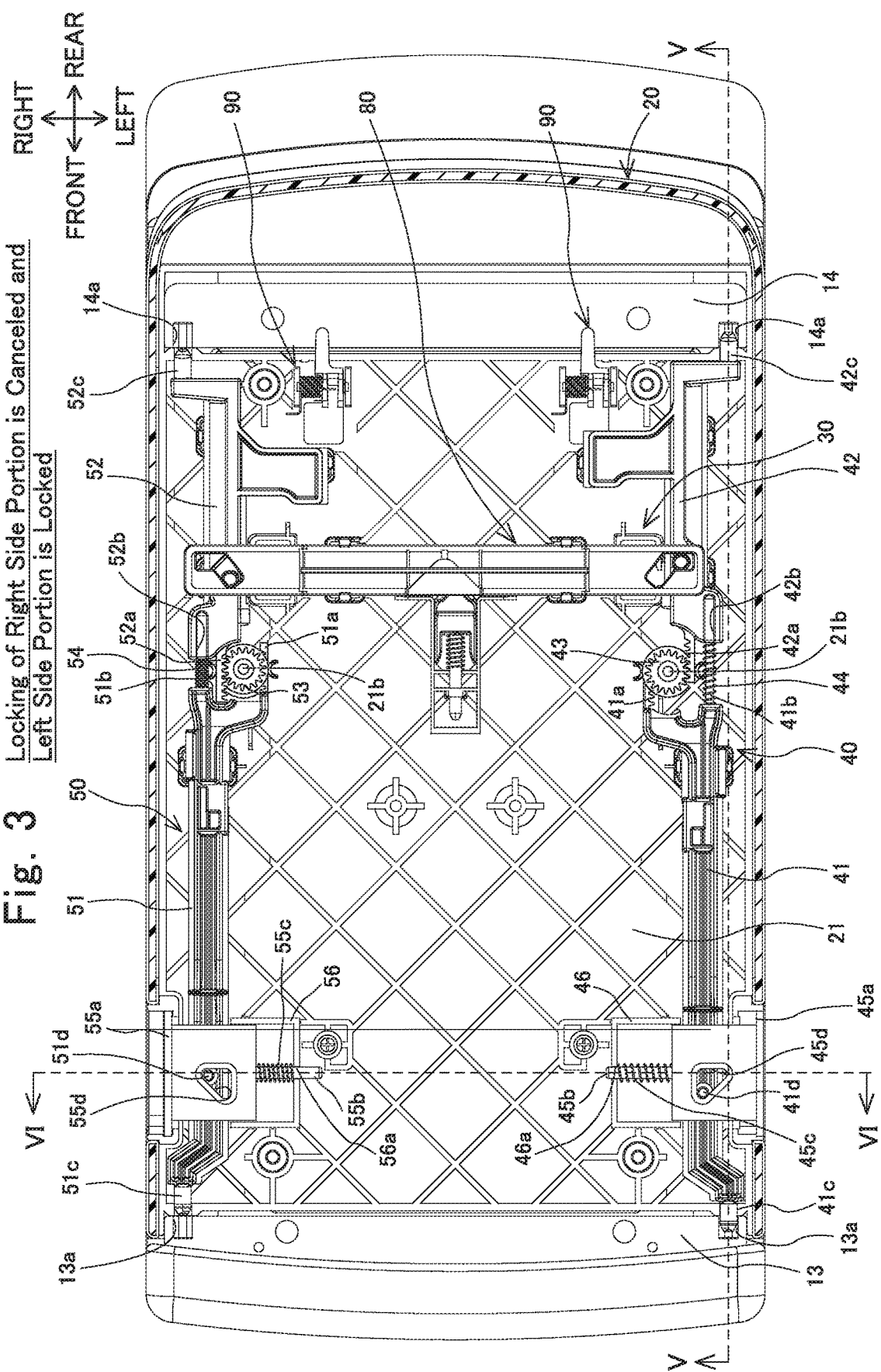
FIG. 3 is a horizontal cross-sectional view of the double opening storage device at a closed position according to the present embodiment.
Figure 4:
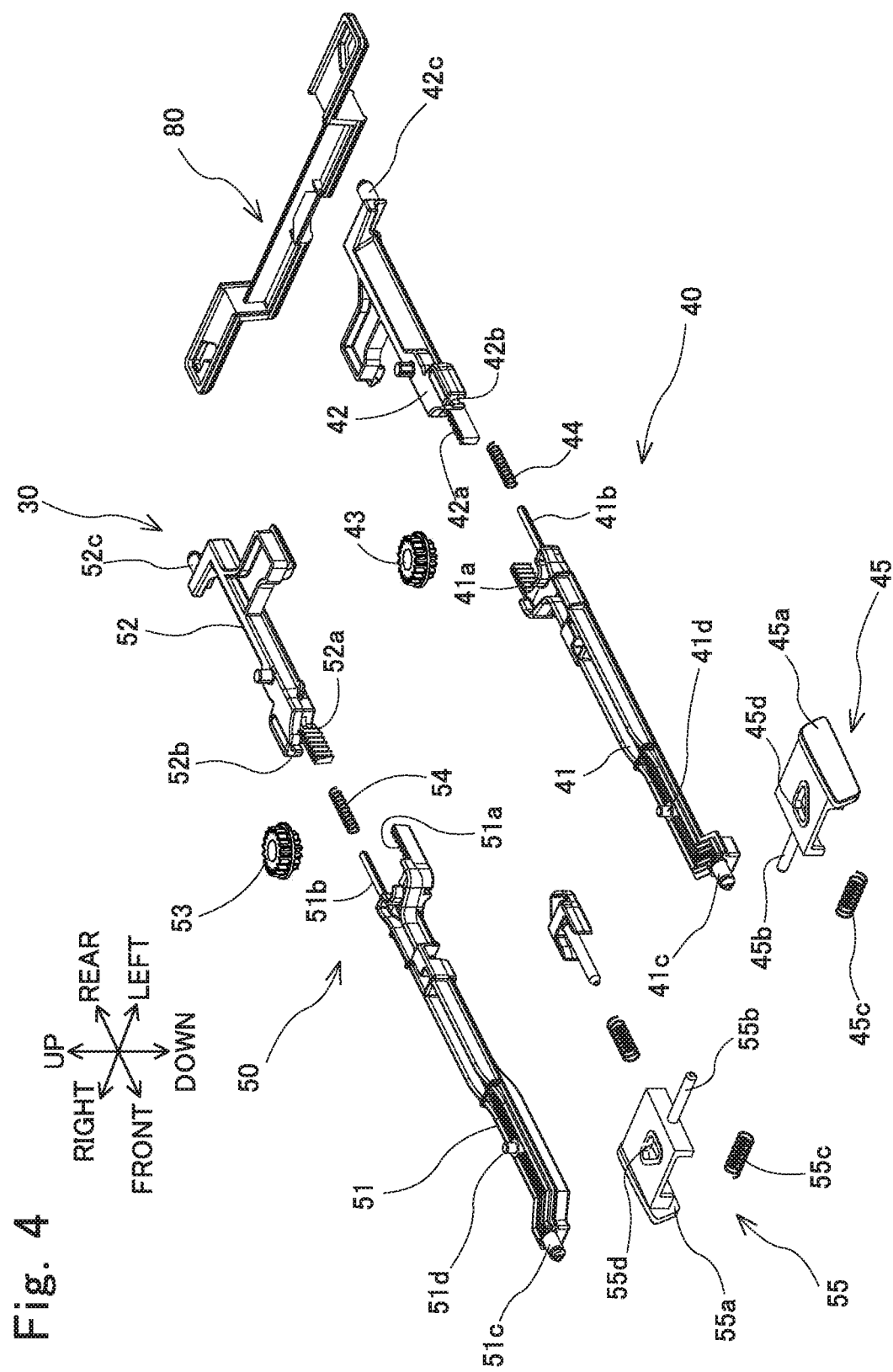
FIG. 4 is an exploded perspective view of an opening and closing mechanism of the double opening storage device according to the present embodiment.

The left side opening and closing mechanism 40 includes a front left side locking member 41, a rear left side locking member 42, and a left side conversion unit 43, as shown in FIG. 3 and FIG. 4. The front left side locking member 41 is disposed on the front side. The rear left side locking member 42 is disposed on the rear side. The front left side locking member 41 and the rear left side locking member 42 are each a rod body that extends in the front-rear direction, and are held by the lower lid member 21 of the lid 20 so as to be movable in the front-rear direction.

The left side conversion unit 43 is disposed between the front left side locking member 41 and the rear left side locking member 42. The left side conversion unit 43 is a cylindrical rotating member having a pinion gear formed on the outer surface. The left side conversion unit 43 is pivotally supported by a center shaft portion 21b that is provided in the lower lid member 21 of the lid 20 so as to protrude, such that the left side conversion unit 43 is rotatable. The left side conversion unit 43 meshes with both a rack gear 41a formed in the front left side locking member 41 and a rack gear 42a formed in the rear left side locking member 42. The rack gear 41a and the rack gear 42a are disposed so as to be symmetric such that the left side conversion unit 43 is between the rack gear 41a and the rack gear 42a. When the front left side locking member 41 moves in the front-rear direction, the rear left side locking member 42 moves in a direction opposite to a direction in which the front left side locking member 41 moves, in synchronization with the front left side locking member 41.

The front left side locking member 41 has a pin 41b formed in the rear end portion. The pin 41b protrudes rearward. The rear left side locking member 42 has a recess 42b formed in the front end portion. The recess 42b is opened forward. The end portion of the pin 41b is inserted in the recess 42b. A spring 44 is fitted onto the outer side of the pin 41b such that the spring 44 and the pin 41b are coaxial with each other. The spring 44 urges the front left side locking member 41 and the rear left side locking member 42 outward in the front-rear direction.

Figure 5:
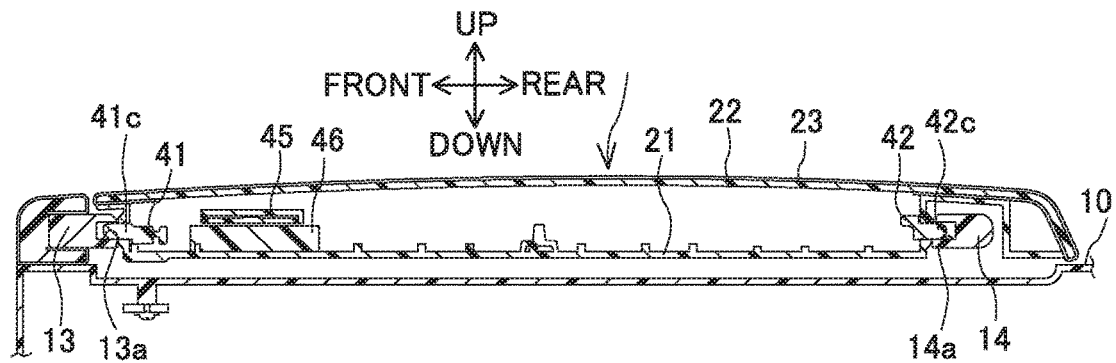
FIG. 5 is a cross-sectional view of the double opening storage device, as taken along V-V in FIG. 3, according to the present embodiment.

The front left side locking member 41 has a rod-like shaft 41c formed in the front end portion. The shaft 41c protrudes forward from the body of the front left side locking member 41, and extends along the long side 11a on one side (that is, left side) of the peripheral edge of the opening 11 of the box body 10. The shaft 41c is inserted in the fixing hole 13a formed in the left end portion of the side wall 13b of the front side member 13 so as to advance and retract, as shown in FIG. 5, and is inserted into and removed from the fixing hole 13a. The rear left side locking member 42 has a rod-like shaft 42c formed in the rear end portion. The shaft 42c protrudes rearward from the body of the rear left side locking member 42, and extends along the long side 11a on the left side of the peripheral edge of the opening 11 of the box body 10. The shaft 42c is inserted in the fixing hole 14a formed in the left end portion of the side wall 14b of the rear side member 14 so as to advance and retract, and is inserted into and removed from the fixing hole 14a.

The right side opening and closing mechanism 50 includes a front right side locking member 51, a rear right side locking member 52, and a right side conversion unit 53. The front right side locking member 51 is disposed on the front side. The rear right side locking member 52 is disposed on the rear side. The front right side locking member 51 and the rear right side locking member 52 are each a rod body that extends in the front-rear direction, and are held by the lower lid member 21 of the lid 20 so as to be movable in the front-rear direction.

The right side conversion unit 53 is disposed between the front right side locking member 51 and the rear right side locking member 52. The right side conversion unit 53 is a cylindrical rotating member having a pinion gear formed on the outer surface. The right side conversion unit 53 is pivotally supported by the center shaft portion 21b that is provided in the lower lid member 21 of the lid 20 so as to protrude, such that the right side conversion unit 53 is rotatable. The right side conversion unit 53 meshes with both a rack gear 51a formed in the front right side locking member 51 and a rack gear 52a formed in the rear right side locking member 52. The rack gear 51a and the rack gear 52a are disposed so as to be symmetric such that the right side conversion unit 53 is between the rack gear 51a and the rack gear 52a. When the front right side locking member 51 moves in the front-rear direction, the rear right side locking member 52 moves in a direction opposite to a direction in which the front right side locking member 51 moves, in synchronization with the front right side locking member 51.

The front right side locking member 51 has a pin 51b formed in the rear end portion. The pin 51b protrudes rearward. The rear right side locking member 52 has a recess 52b formed in the front end portion. The recess 52b is opened forward. The end portion of the pin 51b is inserted in the recess 52b. A spring 54 is fitted onto the outer side of the pin 51b such that the spring 54 and the pin 51b are coaxial with each other. The spring 54 urges the front right side locking member 51 and the rear right side locking member 52 outward in the front-rear direction.

The front right side locking member 51 has a rod-like shaft 51c formed in the front end portion. The shaft 51c protrudes forward from the body of the front right side locking member 51, and extends along the long side 11a on the other side (that is, right side) of the peripheral edge of the opening 11 of the box body 10. The shaft 51c is inserted in the fixing hole 13a formed in the right end portion of the side wall 13b of the front side member 13 so as to advance and retract, and is inserted into and removed from the fixing hole 13a. The rear right side locking member 52 has a rod-like shaft 52c formed in the rear end portion. The shaft 52c protrudes rearward from the body of the rear right side locking member 52, and extends along the long side 11a on the right side of the peripheral edge of the opening 11 of the box body 10. The shaft 52c is inserted in the fixing hole 14a formed in the right end portion of the side wall 14b of the rear side member 14 so as to advance and retract, and is inserted into and removed from the fixing hole 14a.

In a state where the shaft 41c of the front left side locking member 41 of the left side opening and closing mechanism 40 is removed from the fixing hole 13a, and the shaft 42c of the rear left side locking member 42 of the left side opening and closing mechanism 40 is removed from the fixing hole 14a, the shaft 51c of the front right side locking member 51 and the shaft 52c of the rear right side locking member 52 of the right side opening and closing mechanism 50 serve as the rotation center about which the lid 20 pivots, and are rotatable in the fixing holes 13a and 14a. Meanwhile, in a state where the shaft 51c of the front right side locking member 51 of the right side opening and closing mechanism 50 is removed from the fixing hole 13a, and the shaft 52c of the rear right side locking member 52 of the right side opening and closing mechanism 50 is removed from the fixing hole 14a, the shaft 41c of the front left side locking member 41 and the shaft 42c of the rear left side locking member 42 of the left side opening and closing mechanism 40 serve as the rotation center about which the lid 20 pivots, and are rotatable in the fixing holes 13a and 14a.

Figure 6:
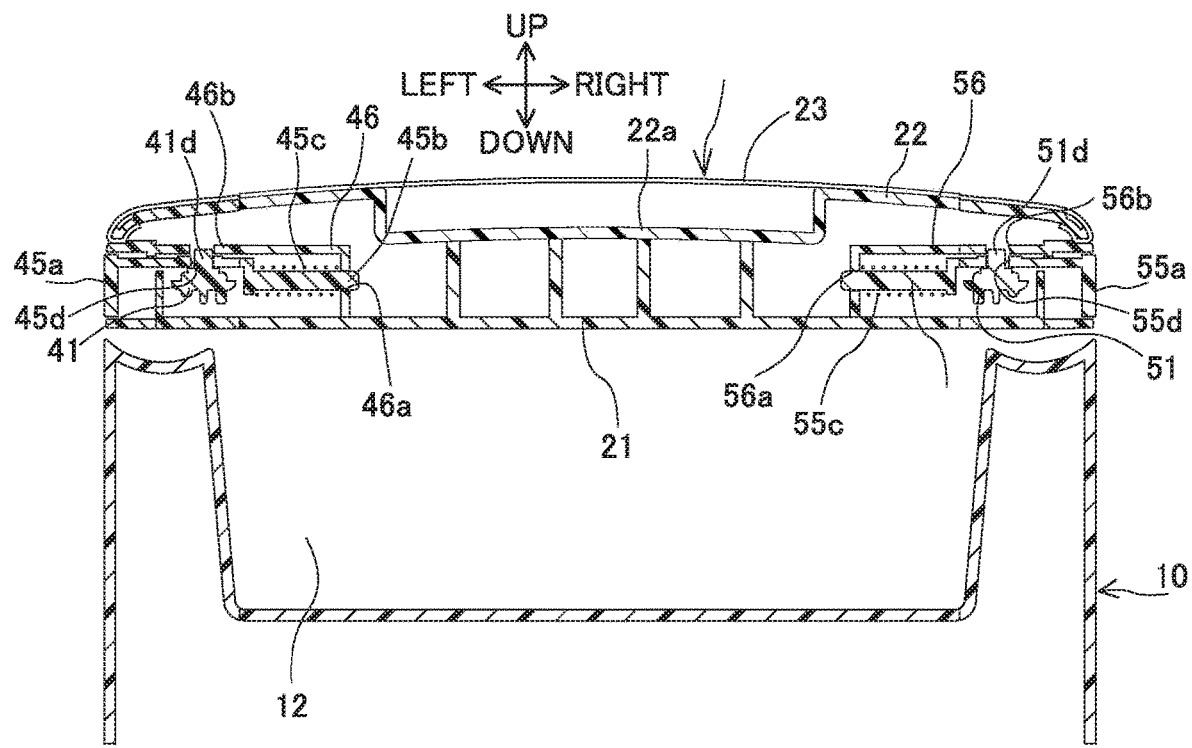
FIG. 6 is a cross-sectional view of the double opening storage device, as taken along VI-VI in FIG. 3, according to the present embodiment.

The left side opening and closing mechanism 40 has a left side operation portion 45. The left side operation portion 45 is provided on the left side of the lid 20. The left side operation portion 45 is stored in an operation storage portion 46 fixed to the lower lid member 21 of the lid 20. The left side operation portion 45 has a button portion 45a, a leg portion 45b, a spring 45c, and a guide hole 45d. The button portion 45a is a member that is pressed by a person in the vehicle in order to open the left side portion of the lid 20 by pivoting the lid 20 about the shafts 51c and 52c on the right side. The leg portion 45b extends rightward on the back surface side of the button portion 45a. The leg portion 45b is fitted in a hole 46a formed in the operation storage portion 46. The spring 45c is fitted onto the outer side of the leg portion 45b as shown in FIG. 6. The button portion 45a is urged leftward by the spring 45c.

The guide hole 45d is formed in a triangular shape. The operation storage portion 46 has a long hole 46b formed so as to be open on the upper surface. The long hole 46b extends such that the front-rear direction is the longitudinal direction of the long hole 46b. The front left side locking member 41 has a projection 41d that projects upward. The projection 41d is inserted in the guide hole 45d and the long hole 46b so as to be movable in the front-rear direction. The projection 41d is disposed on the front end sides of the guide hole 45d and the long hole 46b when the button portion 45a of the left side operation portion 45 is not pressed rightward.

When the button portion 45a of the left side operation portion 45 is pressed rightward, the projection 41d is guided on the tilted surface of the guide hole 45d and is moved relative to the guide hole 45d toward the left side and the rear side of the guide hole 45d. When such a relative movement of the projection 41d occurs, the front left side locking member 41 having the projection 41d is moved rearward. In this case, the left side conversion unit 43 is rotated by the rack gear 41a of the front left side locking member 41 meshing with the pinion gear of the left side conversion unit 43. Therefore, the rear left side locking member 42 having the rack gear 42a that meshes with the left side conversion unit 43 moves in the front direction that is opposite to a direction in which the front left side locking member 41 moves, in synchronization with the front left side locking member 41. Thus, the shaft 41c of the front left side locking member 41 is removed from the fixing hole 13a of the box body 10, and the shaft 42c of the rear left side locking member 42 is removed from the fixing hole 14a of the box body 10, whereby the left side portion of the lid 20 is opened by pivoting the lid 20 about the shafts 51c and 52c on the right side.

The right side opening and closing mechanism 50 has a right side operation portion 55. The right side operation portion 55 is provided on the right side of the lid 20. The right side operation portion 55 is stored in an operation storage portion 56 fixed to the lower lid member 21 of the lid 20. The right side operation portion 55 has a button portion 55a, a leg portion 55b, a spring 55c, and a guide hole 55d. The button portion 55a is a member that is pressed by a person in the vehicle in order to open the right side portion of the lid 20 by pivoting the lid 20 about the shafts 41c and 42c on the left side. The leg portion 55b extends leftward on the back surface side of the button portion 55a. The leg portion 55b is fitted in a hole 56a formed in the operation storage portion 56. The spring 55c is fitted onto the outer side of the leg portion 55b. The button portion 55a is urged rightward by the spring 55c.

The guide hole 55d is formed in a triangular shape. The operation storage portion 56 has a long hole 56b formed so as to be open on the upper surface. The long hole 56b extends such that the front-rear direction is the longitudinal direction of the long hole 56b. The front right side locking member 51 has a projection 51d that projects upward. The projection 51d is inserted in the guide hole 55d and the long hole 56b so as to be movable in the front-rear direction. The projection 51d is disposed on the front end sides of the guide hole 55d and the long hole 56b when the button portion 55a of the right side operation portion 55 is not pressed leftward.

When the button portion 55a of the right side operation portion 55 is pressed leftward, the projection 51d is guided on the tilted surface of the guide hole 55d and is moved relative to the guide hole 55d toward the right side and the rear side of the guide hole 55d. When such a relative movement of the projection 51d occurs, the front right side locking member 51 having the projection 51d is moved rearward. In this case, the right side conversion unit 53 rotates by the rack gear 51a of the front right side locking member 51 meshing with the pinion gear of the right side conversion unit 53. Therefore, the rear right side locking member 52 having the rack gear 52a that meshes with the right side conversion unit 53 moves in the front direction that is opposite to a direction in which the front right side locking member 51 moves, in synchronization with the front right side locking member 51. Thus, the shaft 51c of the front right side locking member 51 is removed from the fixing hole 13a of the box body 10, and the shaft 52c of the rear right side locking member 52 is removed from the fixing hole 14a of the box body 10, whereby the right side portion of the lid 20 is opened by pivoting the lid 20 about the shafts 41c and 42c on the left side.

Figure 8:
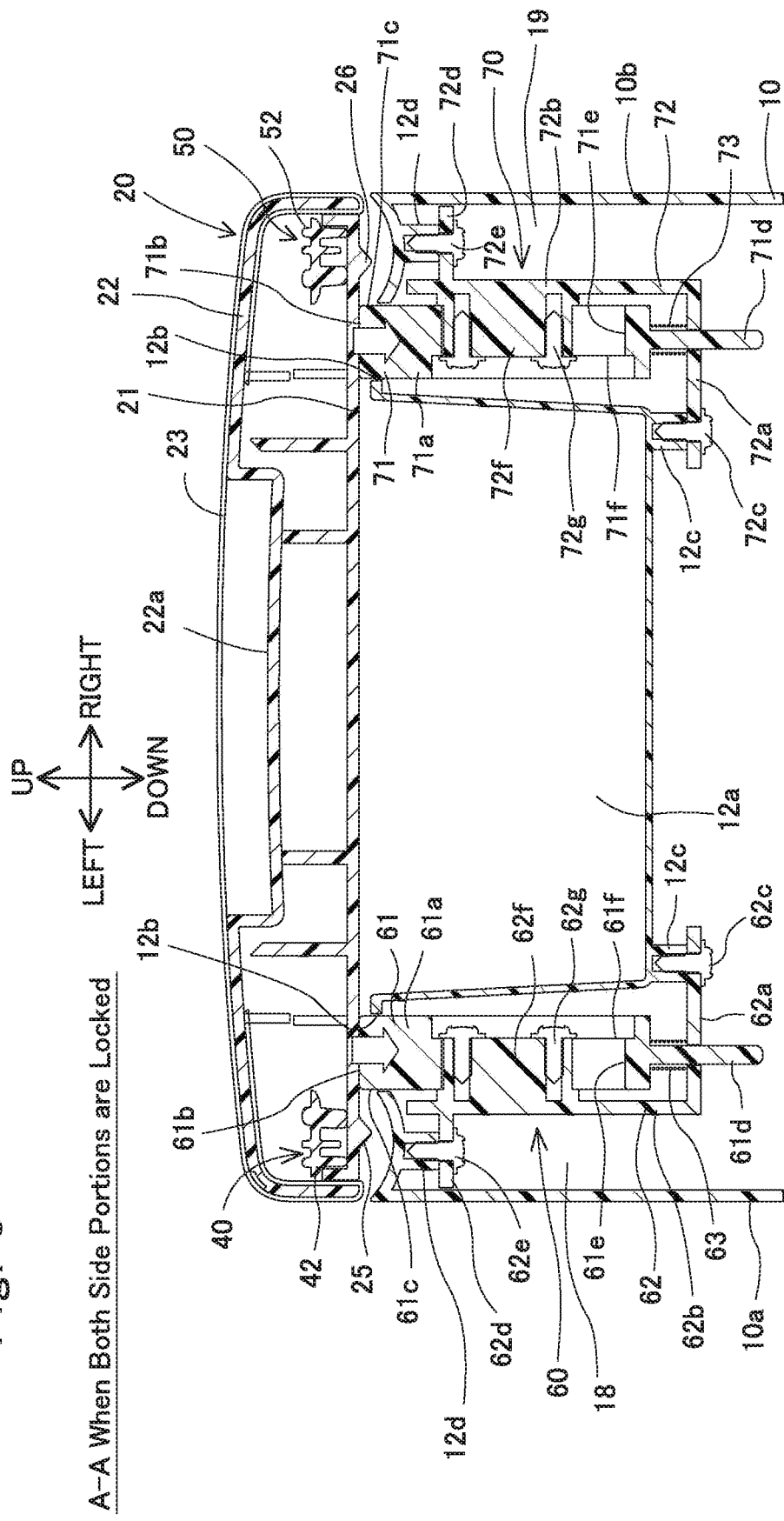
FIG. 8 is a cross-sectional view of the double opening storage device at the closed position, as taken along A-A in FIG. 1, according to the present embodiment.

The opening and closing mechanism 30 further includes a left side opening operation assisting device 60 and a right side opening operation assisting device 70. The left side opening operation assisting device 60 is stored in a left side internal space 18 formed between the pocket portion 12a and a left side wall 10a of the box body 10, as shown in FIG. 8. The left side opening operation assisting device 60 is a device that assists in an opening operation for opening the left side portion of the lid 20, and holds the lid 20 at a right-side fully-opened position. The right side opening operation assisting device 70 is stored in a right side internal space 19 formed between the pocket portion 12a and a right side wall 10b of the box body 10. The right side opening operation assisting device 70 is a device that assists in an opening operation for opening the right side portion of the lid 20, and holds the lid 20 at a left-side fully-opened position.

Figure 7:
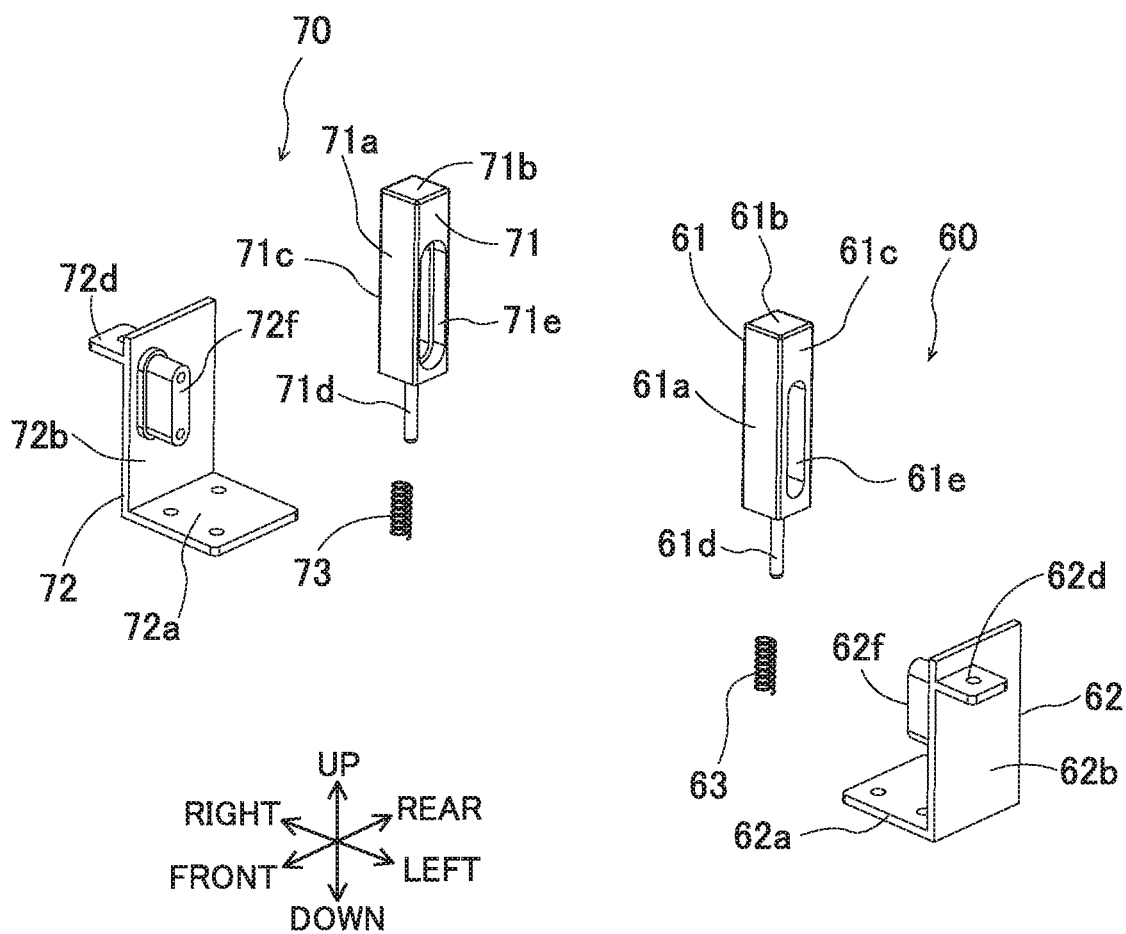
FIG. 7 is an exploded perspective view of a left side opening operation assisting device and a right side opening operation assisting device of the double opening storage device according to the present embodiment.

The left side opening operation assisting device 60 has a left side press-holding portion 61, a left side guide member 62, and a left side urging member 63. The left side press-holding portion 61 is supported by the left side portion of the box body 10 so as to advance and retract in directions (that is, vertically up-down direction) in which the left side portion of the lid 20 is opened and closed. The left side press-holding portion 61 has a long member 61a, a contact surface 61b, a holding surface 61c, a leg portion 61d, and a long hole 61e, as shown in FIG. 7. The long member 61a extends in the vertically up-down direction. The long member 61a is inserted in a hole 12b formed in the left side peripheral edge of the storage portion 12 of the box body 10 so as to advance and retract in the vertically up-down direction. The contact surface 61b is formed at the upper end of the long member 61a, and contacts with the back surface of the lid 20. The holding surface 61c is formed on the left side of the long member 61a, and extends along the back surface of the lid 20 at the right-side fully-opened position of the lid 20 and is disposed close to the back surface of the lid 20. The leg portion 61d extends so as to project downward from the lower end of the long member 61a. The long hole 61e is formed at the center portion, in the vertically up-down direction, of the long member 61a, and is opened in the left-right direction, and extends longitudinally in the vertically up-down direction.

The left side guide member 62 is a thin L-shaped piece. The left side guide member 62 has a left side fixing portion 62a and a left side guide portion 62b. The left side fixing portion 62a is plate-shaped, and extends in the horizontal direction. The left side guide member 62 is attached to the box body 10 by the left side fixing portion 62a being fixed, by a screw 62c, to an attaching portion 12c that projects downward from the bottom surface of the pocket portion 12a of the box body 10.

The left side guide portion 62b is plate-shaped, and extends from the left end of the left side fixing portion 62a in the vertically upward direction. In the upper portion of the left side guide portion 62b, a projecting piece 62d that is plate-shaped and extends leftward is formed. The left side guide member 62 is attached to the box body 10 by the projecting piece 62d being fixed, by a screw 62e, to an attaching portion 12d that projects downward from the left side peripheral edge of the storage portion 12 of the box body 10.

The left side guide portion 62b has a projection 62f formed so as to project rightward. The projection 62f extends in the vertically up-down direction. The projection 62f is inserted in the long hole 61e of the left side press-holding portion 61 so as to be movable in the vertically up-down direction. A screw 62g is screwed into the projection 62f. The head portion of the screw 62g is slidably engaged with a step portion 61f formed in the long hole 61e. Thus, while the projection 62f is prevented from being removed from the long hole 61e, the projection 62f is inserted so as to be slidable in the long hole 61e. The left side press-holding portion 61 is positioned at the lowermost end when the projection 62f is positioned at the upper end portion of the long hole 61e, and is positioned at the uppermost end when the projection 62f is positioned at the lower end portion of the long hole 61e.

The left side urging member 63 is a coil spring that is fitted onto the outer side of the leg portion 61d of the left side press-holding portion 61. The left side urging member 63 extends in the vertically up-down direction. One end of the left side urging member 63 is engaged with and stopped by the lower surface of the long member 61a of the left side press-holding portion 61. The other end of the left side urging member 63 is engaged with and stopped by the left side fixing portion 62a of the left side guide member 62. The left side urging member 63 urges the left side press-holding portion 61 in the vertically upward direction. When the lid 20 is locked at the closed position, the lid 20 is pressed upward by the contact surface 61b disposed at the upper end of the long member 61a of the left side press-holding portion 61 contacting with the back surface of the lid 20 due to an urging force by the left side urging member 63.

In this state, by a button operation by the left side operation portion 45, the locking of the lid 20 at the left side closed position is canceled, and the left side portion of the lid 20 is opened, so that the left side press-holding portion 61 presses the left side portion of the lid 20 upward due to an urging force, by the left side urging member 63, applied to the contact surface 61b. The upward pressing by the left side press-holding portion 61 is performed up to a temporary opened position at which the urging force by the left side urging member 63 becomes zero.

Figure 10:
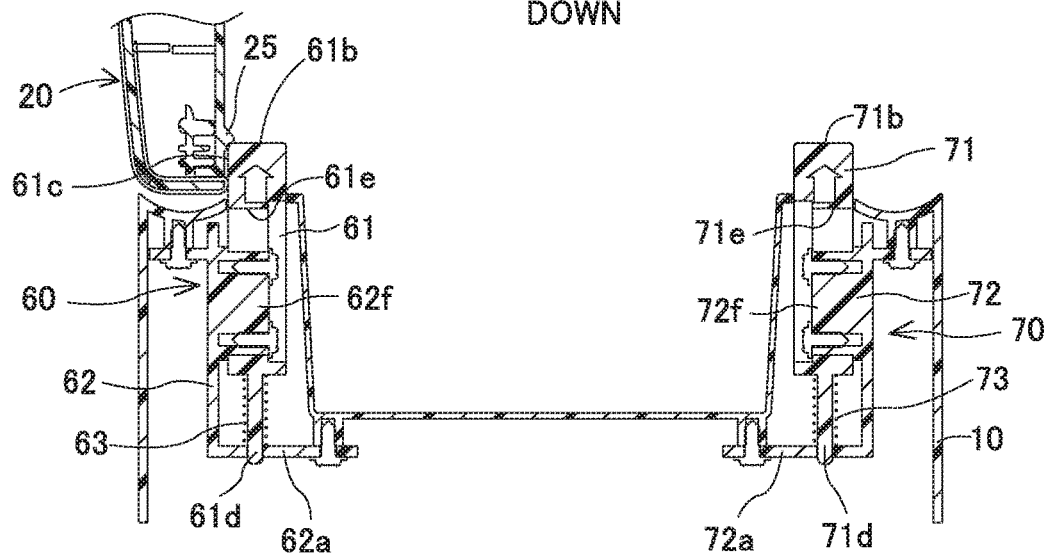
FIG. 10 is a cross-sectional view of the double opening storage device at a right side opened position, as taken along A-A in FIG. 1, according to the present embodiment.

When the right side portion of the lid 20 is opened, the left side press-holding portion 61 is disposed adjacent to the right side portion of the lid 20 that is erected in the vertical direction by the right side portion being opened, thereby holding the lid 20 at the right-side fully-opened position by engagement-stopping. A left side engage-stopping portion 25 having an almost triangular cross-section is formed on the left side peripheral edge of the lower lid member 21 of the lid 20. The left side engage-stopping portion 25 projects vertically downward from the back surface of the lower lid member 21 at the closed position of the lid 20, and projects rightward at the right-side fully-opened position of the lid 20. When the right side portion of the lid 20 is opened, the left side press-holding portion 61 moves upward relative to the left side guide member 62, that is, relative to the box body 10, due to an urging force by the left side urging member 63, and is engaged with and stopped by the left side engage-stopping portion 25 of the lid 20, as shown in FIG. 10. Thus, the lid 20 is held at the right-side fully-opened position. At this time, when an external force by which the lid 20 is pressed toward the closed position is lower than the urging force by the left side urging member 63, the lid 20 is locked by the left side press-holding portion 61, and the lid 20 is thus prevented from tilting toward the closed position.

The right side opening operation assisting device 70 has a right side press-holding portion 71, a right side guide member 72, and a right side urging member 73. The right side press-holding portion 71 is supported by the right side portion of the box body 10 so as to advance and retract in directions (that is, vertically up-down direction) in which the right side portion of the lid 20 is opened and closed. The right side press-holding portion 71 has a long member 71a, a contact surface 71b, a holding surface 71c, a leg portion 71d, and a long hole 71e. The long member 71a extends in the vertically up-down direction. The long member 71a is inserted in a hole 12b formed in the right side peripheral edge of the storage portion 12 of the box body 10 so as to advance and retract in the vertically up-down direction. The contact surface 71b is formed at the upper end of the long member 71a, and contacts with the back surface of the lid 20. The holding surface 71c is formed on the right side of the long member 71a, and extends along the back surface of the lid 20 at the left-side fully-opened position of the lid 20 and is disposed close to the back surface of the lid 20. The leg portion 71d extends so as to project downward from the lower end of the long member 71a. The long hole 71e is formed at the center portion, in the vertically up-down direction, of the long member 71a, and is opened in the left-right direction, and extends longitudinally in the vertically up-down direction.

The right side guide member 72 is a thin L-shaped piece. The right side guide member 72 has a right side fixing portion 72a and a right side guide portion 72b. The right side fixing portion 72a is plate-shaped, and extends in the horizontal direction. The right side guide member 72 is attached to the box body 10 by the right side fixing portion 72a being fixed, by a screw 72c, to an attaching portion 12c that projects downward from the bottom surface of the pocket portion 12a of the box body 10.

The right side guide portion 72b is plate-shaped, and extends from the right end of the right side fixing portion 72a in the vertically upward direction. In the upper portion of the right side guide portion 72b, a projecting piece 72d that is plate-shaped and extends rightward is formed. The right side guide member 72 is attached to the box body 10 by the projecting piece 72d being fixed, by a screw 72e, to an attaching portion 12d that projects downward from the right side peripheral edge of the storage portion 12 of the box body 10.

The right side guide portion 72b has a projection 72f formed so as to project leftward. The projection 72f extends in the vertically up-down direction. The projection 72f is inserted in the long hole 71e of the right side press-holding portion 71 so as to be movable in the vertically up-down direction. A screw 72g is screwed into the projection 72f. The head portion of the screw 72g is slidably engaged with a step portion 71f formed in the long hole 71e. Thus, while the projection 72f is prevented from being removed from the long hole 71e, the projection 72f is inserted so as to be slidable in the long hole 71e. The right side press-holding portion 71 is positioned at the lowermost end when the projection 72f is positioned at the upper end portion of the long hole 71e, and is positioned at the uppermost end when the projection 72f is positioned at the lower end portion of the long hole 71e.

The right side urging member 73 is a coil spring that is fitted onto the outer side of the leg portion 71d of the right side press-holding portion 71. The right side urging member 73 extends in the vertically up-down direction. One end of the right side urging member 73 is engaged with and stopped by the lower surface of the long member 71a of the right side press-holding portion 71. The other end of the right side urging member 73 is engaged with and stopped by the right side fixing portion 72a of the right side guide member 72. The right side urging member 73 urges the right side press-holding portion 71 in the vertically upward direction. When the lid 20 is locked at the closed position, the lid 20 is pressed upward by the contact surface 71b disposed at the upper end of the long member 71a of the right side press-holding portion 71 contacting with the back surface of the lid 20 due to an urging force by the right side urging member 73.

Figure 9:
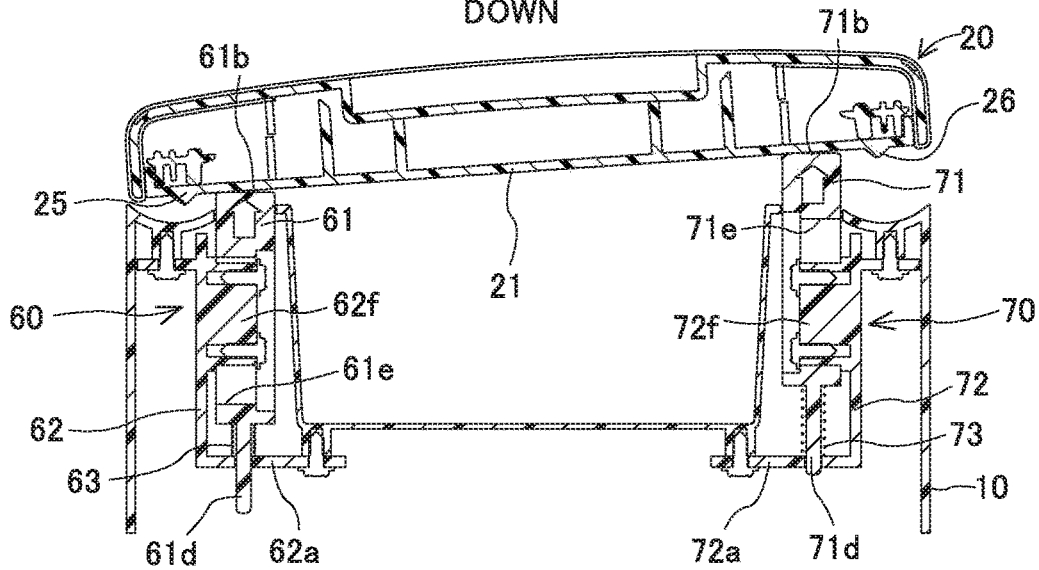
FIG. 9 is a cross-sectional view of the double opening storage device in the case of locking of the right side portion being canceled, as taken along A-A in FIG. 1, according to the present embodiment.

In this state, by a button operation by the right side operation portion 55, the locking of the lid 20 at the right side closed position is canceled, and the right side portion of the lid 20 is opened, so that the right side press-holding portion 71 presses the right side portion of the lid 20 upward due to an urging force, by the right side urging member 73, applied to the contact surface 71b, as shown in FIG. 9. The upward pressing by the right side press-holding portion 71 is performed up to a temporary opened position at which the urging force by the right side urging member 73 becomes zero.

When the left side portion of the lid 20 is opened, the right side press-holding portion 71 is disposed adjacent to the left side portion of the lid 20 that is erected in the vertical direction by the left side portion being opened, thereby holding the lid 20 at the left-side fully-opened position by engagement-stopping. A right side engage-stopping portion 26 having an almost triangular cross-section is formed on the right side peripheral edge of the lower lid member 21 of the lid 20. The right side engage-stopping portion 26 projects vertically downward from the back surface of the lower lid member 21 at the closed position of the lid 20, and projects leftward at the left-side fully-opened position of the lid 20. When the left side portion of the lid 20 is opened, the right side press-holding portion 71 moves upward relative to the right side guide member 72, that is, relative to the box body 10, due to an urging force by the right side urging member 73, and is engaged with and stopped by the right side engage-stopping portion 26 of the lid 20. Thus, the lid 20 is held at the left-side fully-opened position. At this time, when an external force by which the lid 20 is pressed toward the closed position is lower than the urging force by the right side urging member 73, the lid 20 is locked by the right side press-holding portion 71, and the lid 20 is thus prevented from tilting toward the closed position.

The opening and closing mechanism 30 further includes a malfunction prevention device 80 and a regulation device 90 as shown in FIG. 2 to FIG. 4. The malfunction prevention device 80 prevents both the left side opening and closing mechanism 40 and the right side opening and closing mechanism 50 from simultaneously performing the opening operation. The regulation device 90 performs regulation such that the locking members 41, 42, 51, 52 advance outward in the front-rear direction of the lid 20 in the left side opening and closing mechanism 40 or the right side opening and closing mechanism 50 on the side where the lid 20 is opened.

Next, an operation of the double opening storage device 1 will be described.

In the double opening storage device 1, when the lid 20 is closed relative to the box body 10, the shaft 41c of the front left side locking member 41 of the left side opening and closing mechanism 40 in the opening and closing mechanism 30 is inserted in the fixing hole 13a on the left side of the front side member 13 of the box body 10, the shaft 42c of the rear left side locking member 42 of the left side opening and closing mechanism 40 is inserted in the fixing hole 14a on the left side of the rear side member 14 of the box body 10, the shaft 51c of the front right side locking member 51 of the right side opening and closing mechanism 50 is inserted in the fixing hole 13a on the right side of the front side member 13 of the box body 10, and the shaft 52c of the rear right side locking member 52 of the right side opening and closing mechanism 50 is inserted in the fixing hole 14a on the right side of the rear side member 14 of the box body 10. Thus, in a case where the shafts 41c, 42c, 51c, and 52c attached to the lid 20 are inserted in the fixing holes 13a and 14a of the box body 10, neither the left side portion nor the right side portion of the lid 20 is opened relative to the box body 10, and the lid 20 is thus held at the closed position.

When the lid 20 is held at the closed position, the lid 20 is held so as to be pressed upward on both the left side and the right side due to an urging force by the left side urging member 63 of the left side opening operation assisting device 60 and an urging force by the right side urging member 73 of the right side opening operation assisting device 70.

When the button portion 45a of the left side operation portion 45 is pressed rightward at the above-described closed position of the lid 20, the projection 41d which is inserted in the guide hole 45d is moved leftward and rearward relative to the guide hole 45d along the tilted surface of the guide hole 45d in the guide hole 45d. In this case, the front left side locking member 41 having the projection 41d is moved rearward, whereby the shaft 41c of the front left side locking member 41 is removed from the fixing hole 13a of the box body 10. When the front left side locking member 41 is moved rearward, the rear left side locking member 42 is simultaneously moved forward due to the action of the left side conversion unit 43, whereby the shaft 42c of the rear left side locking member 42 is removed from the fixing hole 14a of the box body 10.

When the shafts 41c and 42c of the front left side locking member 41 and the rear left side locking member 42 are removed from the fixing holes 13a and 14a of the box body 10, locking of the lid 20 at the left side closed position is canceled, and the left side portion of the lid 20 is opened. In this case, the left side portion of the lid 20 is pressed upward due to an urging force by the left side urging member 63 of the left side opening operation assisting device 60, whereby the lid 20 is opened up to the left side temporary opened position by pivoting about the shafts 51c and 52c of the front right side locking member 51 and the rear right side locking member 52.

When the button portion 55a of the right side operation portion 55 is pressed leftward at the above-described closed position of the lid 20, the projection 51d which is inserted in the guide hole 55d is moved rightward and rearward relative to the guide hole 55d along the tilted surface of the guide hole 55d in the guide hole 55d. In this case, the front right side locking member 51 having the projection 51d is moved rearward, whereby the shaft 51c of the front right side locking member 51 is removed from the fixing hole 13a of the box body 10. When the front right side locking member 51 is moved rearward, the rear right side locking member 52 is simultaneously moved forward due to the action of the right side conversion unit 53, whereby the shaft 52c of the rear right side locking member 52 is removed from the fixing hole 14a of the box body 10.

When the shafts 51c and 52c of the front right side locking member 51 and the rear right side locking member 52 are removed from the fixing holes 13a and 14a of the box body 10, locking of the lid 20 at the right side closed position is canceled, and the right side portion of the lid 20 is opened. In this case, the right side portion of the lid 20 is pressed upward due to an urging force by the right side urging member 73 of the right side opening operation assisting device 70, whereby the lid 20 is opened up to the right side temporary opened position by pivoting about the shafts 41c and 42c of the front left side locking member 41 and the rear left side locking member 42.

Thus, in the double opening storage device 1, the lid 20 is opened, from the closed position at which the lid 20 covers the opening 11 of the box body 10, up to the left side temporary opened position, by pivoting about the shafts 51c and 52c on the right side, and the lid 20 is opened, from the closed position at which the lid 20 covers the opening 11 of the box body 10, up to the right side temporary opened position, by pivoting about the shafts 41c and 42c on the left side. The lid 20 is opened or closed by selecting any one of a set of the shafts 51c and 52c on the right side and a set of the shafts 41c and 42c on the left side as the shafts about which the lid 20 pivots.

After the lid 20 has been opened up to the left side or the right side temporary opened position by the opening and closing mechanism 30, the lid 20 is opened up to the left-side fully-opened position or the right-side fully-opened position by manual operation by a person in the vehicle. When the lid 20 is opened toward the left-side fully-opened position, the right side press-holding portion 71 of the right side opening operation assisting device 70 is moved upward due to an urging force by the right side urging member 73, and is engaged with and stopped by the right side engage-stopping portion 26. In this case, the left side portion of the lid 20 is opened, and the right side press-holding portion 71 is disposed adjacent to the left side portion of the lid 20 that is erected in the vertical direction, whereby the lid 20 is held at the left-side fully-opened position. When the lid 20 is opened toward the right-side fully-opened position, the left side press-holding portion 61 of the left side opening operation assisting device 60 is moved upward due to an urging force by the left side urging member 63, and is engaged with and stopped by the left side engage-stopping portion 25. In this case, the right side portion of the lid 20 is opened, and the left side press-holding portion 61 is disposed adjacent to the right side portion of the lid 20 that is erected in the vertical direction, whereby the lid 20 is held at the right-side fully-opened position.

When the lid 20 is closed relative to the box body 10 from the opened position to the closed position, the lid 20 is pressed downward by manual operation by a person in the vehicle. For example, in a case where the lid 20 is pressed downward when the lid 20 is closed from the left-side fully-opened position to the closed position, the lid 20 firstly presses, by the right side portion of the back surface of the lid 20, the right side press-holding portion 71 downward against an urging force by the right side urging member of the right side opening operation assisting device 70. Thereafter, the lid 20 presses, by the left side portion of the back surface of the lid 20, the left side press-holding portion 61 downward against an urging force by the left side urging member 63 of the left side opening operation assisting device 60. When the downward pressing by the lid 20 at the left-side fully-opened position is performed up to positions at which the shafts 41c and 42c of the left side opening and closing mechanism 40 are inserted into the fixing holes 13a and 14a of the box body 10, the shafts 41c and 42c are inserted in, engaged with, and stopped into the fixing holes 13a and 14a. Thus, the left side portion of the lid 20 is held at the closed position. When the lid 20 is closed from the right-side fully-opened position to the closed position, the lid 20 is pressed downward, and the shafts 51c and 52c of the right side opening and closing mechanism 50 are inserted in, engaged with, and stopped into the fixing holes 13a and 14a of the box body 10. Thus, the right side portion of the lid 20 is held at the closed position.

Next, the advantageous structure of the double opening storage device 1 according to the present embodiment will be described.

In the double opening storage device 1, the lid 20 has: the lower lid member 21; the shafts 41c and 42c of the left side opening and closing mechanism 40 which extends so as to advance and retract in the front-rear direction relative to the lower lid member 21; and the shafts 51c and 52c of the right side opening and closing mechanism 50 which extends so as to advance and retract in the front-rear direction relative to the lower lid member 21. The shafts 41c and 42c extend so as to advance and retract along the rotation shaft which is provided along the long side 11a on the left side of the peripheral edge of the opening 11 of the box body 10. The shafts 51c and 52c extend so as to advance and retract along the rotation shaft which is provided along the long side 11a on the right side of the peripheral edge of the opening 11 of the box body 10. The box body 10 includes: the front side member 13 and the rear side member 14 fixed to the peripheral edge of the storage portion 12; the fixing holes 13a and 14a formed in the left end portions of the side walls 13b and 14b of the front side member 13 and the rear side member 14; and the fixing holes 13a and 14a formed in the right end portions of the side walls 13b and 14b of the front side member 13 and the rear side member 14.

The shafts 41c and 42c are inserted into and removed from the fixing holes 13a and 14a in the left end portions, and, when the shafts 41c and 42c are inserted, the shafts 41c and 42c are rotatably supported. The shafts 51c and 52c are inserted into and removed from the fixing holes 13a and 14a in the right end portions, and, when the shafts 51c and 52c are inserted, the shafts 51c and 52c are rotatably supported. That is, the shafts 41c and 42c of the lid 20 serve as latch pins for allowing the left side opening and closing mechanism 40 to hold the lid 20 at the closed position and cancel the holding, and also serve as rotation shafts about which the lid 20 pivots when the lid 20 is opened and closed by the right side opening and closing mechanism 50. The shafts 51c and 52c of the lid 20 serve as latch pins for allowing the right side opening and closing mechanism 50 to hold the lid 20 at the closed position and cancel the holding, and also serve as rotation shafts about which the lid 20 pivots when the lid 20 is opened and closed by the left side opening and closing mechanism 40.

In a state where the shafts 41c and 42c on the left side are inserted in the fixing holes 13a and 14a in the left end portion of the box body 10, and the shafts 51c and 52c on the right side are removed from the fixing holes 13a and 14a in the right end portion of the box body 10, the right side opening and closing mechanism 50 opens and closes the lid 20 by pivoting the lid 20 about the shafts 41c and 42c between the closed position and the right-side fully-opened position. In a state where the shafts 41c and 42c on the left side are removed from the fixing holes 13a and 14a in the left end portion of the box body 10, and the shafts 51c and 52c on the right side are inserted in the fixing holes 13a and 14a in the right end portion of the box body 10, the left side opening and closing mechanism 40 opens and closes the lid 20 by pivoting the lid 20 about the shafts 51c and 52c between the closed position and the left-side fully-opened position.

Figure 11:
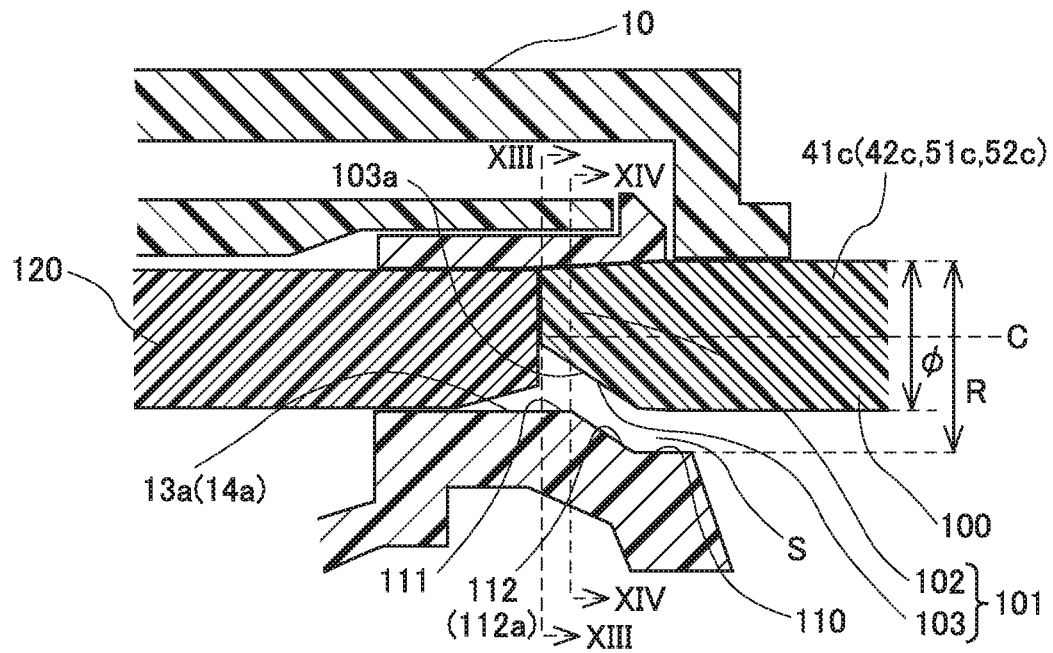
FIG. 11 is a cross-sectional view of the double opening storage device, according to the present embodiment, in which a shaft on a lid side is inserted in a fixing hole of a box body.

The fixing holes 13a and 14a have larger shapes than the corresponding shafts 41c, 42c, 51c, and 52c that are inserted and removed. The shape of the fixing hole 13a, 14a may be any shape that allows a gap S necessary for overstroke in inserting and removing the shaft 41c, 42c, 51c, 52c to be formed between a hole wall of the fixing hole 13a, 14a and an outer surface of the shaft 41c, 42c, 51c, 52c such that insertion and removal of the shaft 41c, 42c, 51c, 52c that is a latch pin are facilitated, as shown in FIG. 11. The fixing hole 13a, 14a may be any hole that satisfies at least a condition in which a dimension R of the fixing hole 13a, 14a in the up-down direction is greater than a dimension ø, in the up-down direction, of the corresponding shaft 41c, 42c, 51c, 52c to be inserted and removed.

Each shaft 41c, 42c, 51c, 52c has a body portion 100 that is formed so as to have an almost round cross-section; and a leading end portion 101 provided on the leading end side of the body portion 100. The body portion 100 has an almost constant distance from an axis C to the outer surface around the circumference. The leading end portion 101 protrudes so as to be pointed toward the leading end in the axial direction from the body portion 100, and is structured such that a distance varies from the axis C of the body portion 100 to the outer surface around the circumference. The leading end portion 101 includes: a non-cut portion 102 having an almost constant distance from the axis C of the body portion 100 to the outer surface; and a cut portion 103 obtained by a part of a circumferential portion being cut out, and having a distance, from the axis C of the body portion 100 to the outer surface, which is less than the distance in the non-cut portion 102.

Figure 12:
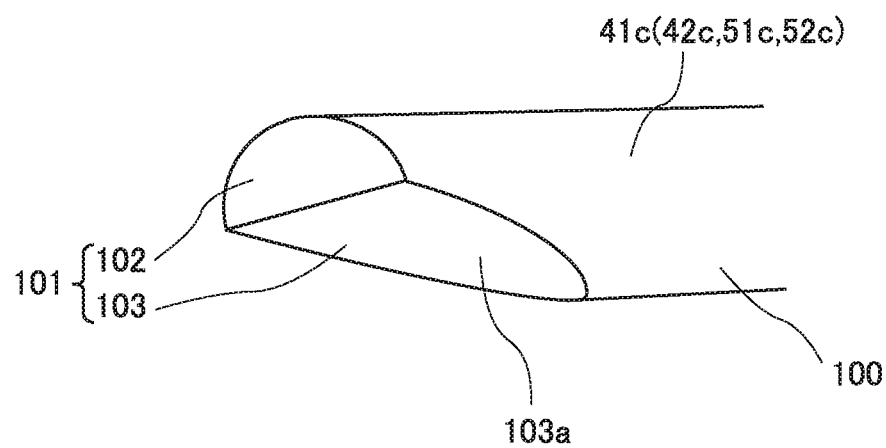
FIG. 12 is a perspective view of a main portion of the shaft of the lid of the double opening storage device according to the present embodiment.

The cut portion 103 is disposed at the lower portion of the shaft 41c, 42c, 51c, 52c at the closed position of the lid 20, and the position of the cut portion 103 is changed upward while the cut portion 103 moves around the axis C in the circumferential direction according to the lid 20 being opened, that is, the shaft 41c, 42c, 51c, 52c being rotated. The cut portion 103 is formed so as to have a tilted surface 103a that is tilted from the leading end toward the depth side in the axial direction, as shown in FIG. 12. The tilted surface 103a is a ceiling surface having a surface height position which is lowered from the leading end toward the depth side in the axial direction at the closed position of the lid 20.

The shaft 41c, 42c, 51c, 52c is tapered so as to have the diameter reduced from the depth side in the axial direction toward the leading end in the non-cut portion 102 other than the cut portion 103. The tapered structure of the shaft 41c, 42c, 51c, 52c is effective for assuring easy insertion into the fixing hole 13a, 14a. The outer surface of the body portion 100 of the shaft 41c, 42c, 51c, 52c is indicated by an alternate long and short dash line in FIG. 13, FIG. 14, and FIG. 16 to FIG. 18.

The fixing hole 13a, 14a is formed so as to have a dimension (cross-sectional area) reduced from the hole opening side through which the shaft 41c, 42c, 51c, 52c is inserted, toward the hole depth side in the axial direction. That is, the fixing hole 13a, 14a has a hole opening portion 110 formed on the opening side, and a hole depth portion 111 formed on the depth side in the axial direction relative to the hole opening portion 110. The hole opening portion 110 is formed so as to have a cross-sectional area greater than a cross-sectional area of the shaft 41c, 42c, 51c, 52c (specifically, body portion 100). The dimension R, in the up-down direction, of the hole opening portion 110 is greater than the dimension ø, in the up-down direction, of the body portion 100. The hole depth portion 111 is formed so as to have a cross-sectional area less than the hole opening portion 110. That is, the box body 10 has a projection 112 that projects from a part of the hole wall of the hole opening portion 110 toward the hole center side in the hole depth portion 111. The hole wall of the hole opening portion 110 of the fixing hole 13a, 14a is indicated by an alternate long and two short dashes line in FIG. 13, FIG. 14, and FIG. 16 to FIG. 18.

Figure 13:
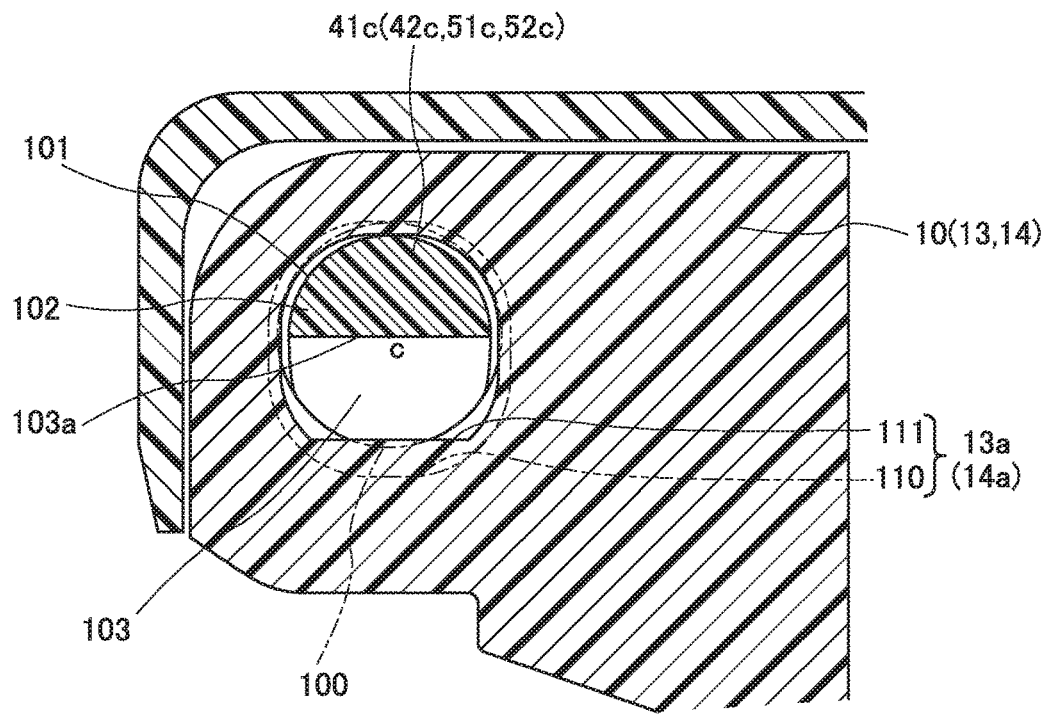
FIG. 13 is a cross-sectional view, as taken along XIII-XIII in FIG. 11, showing a positional relationship between the shaft and the fixing hole at the closed position of the lid in the double opening storage device according to the present embodiment.
Figure 14:
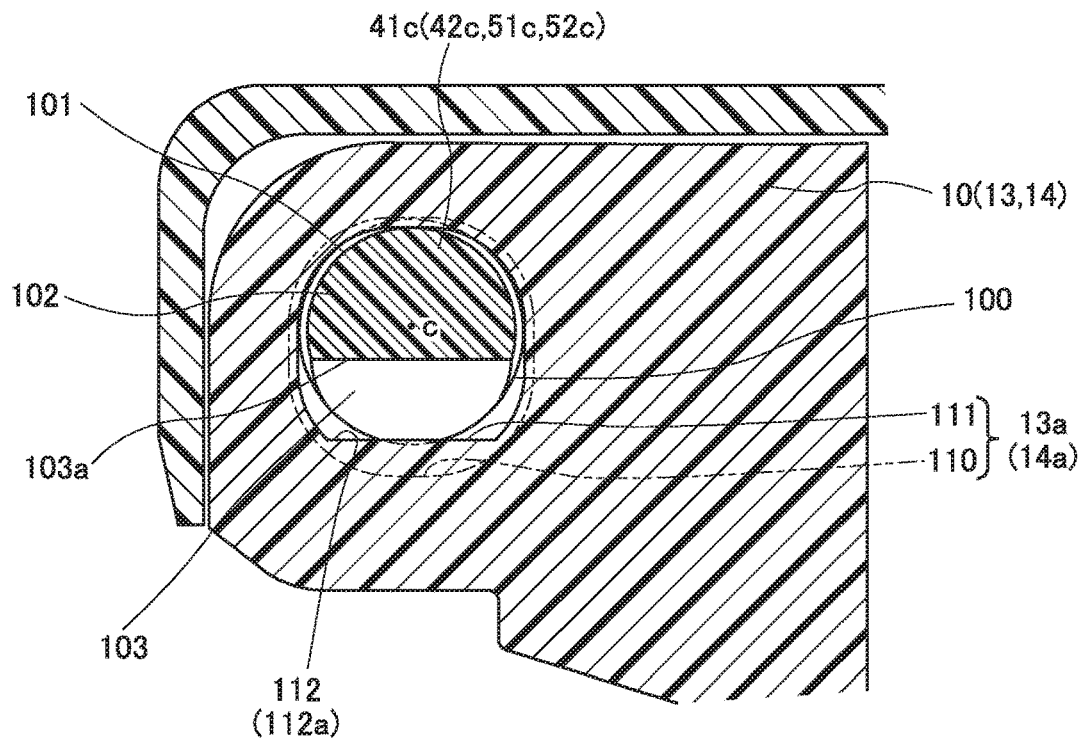
FIG. 14 is a cross-sectional view, as taken along XIV-XIV in FIG. 11, showing a positional relationship between the shaft and the fixing hole at the closed position in the double opening storage device according to the present embodiment.

When the shaft 41c, 42c, 51c, 52c is inserted in the fixing hole 13a, 14a, the projection 112 is positioned at a position which the leading end portion 101 having the cut portion 103 reaches, that is, a position where the projection 112 and the leading end portion 101 overlap each other in the axial direction. The projection 112 is formed into a chord-like portion that projects from the lower surface of the hole wall in the upward direction, that is, toward the hole center side, as viewed from the outer side, in the axial direction, of the fixing hole 13a, 14a. The projection 112 is formed so as to have a tilted surface 112a that is tilted from the hole opening side toward the hole depth side in the axial direction, as shown in FIG. 11, FIG. 13, and FIG. 14. The tilted surface 112a is a lower surface having a surface height position increased from the hole opening side toward the hole depth side in the axial direction.

At the closed position, of the lid 20, where the shaft 41c, 42c, 51c, and 52c is inserted in the fixing hole 13a, 14a, the shaft 41c, 42c, 51c, 52c and the fixing hole 13a, 14a are disposed such that the tilted surface 103a of the leading end portion 101 of the shaft 41c, 42c, 51c, 52c, and the tilted surface 112a of the hole depth portion 111 of the fixing hole 13a, 14a oppose each other in the diagonally up-down direction.

A support member 120 with which the end surface (leading end surface), in the axial direction, of the leading end portion 101 of the shaft 41c, 42c, 51c, 52c contacts may be inserted and disposed on the hole depth side, in the axial direction, of the fixing hole 13a, 14a, as shown in FIG. 11. The support member 120 is a member for positioning the shaft 41c, 42c, 51c, 52c when the shaft 41c, 42c, 51c, 52c is inserted in the fixing hole 13a, 14a, and regulating further insertion of the shaft 41c, 42c, 51c, 52c, by the shaft 41c, 42c, 51c, 52c contacting with the support member 120. The support member 120 may have an outer shape that conforms to the hole wall, on the depth side, of the hole depth portion 111 of the fixing hole 13a, 14a.

In the double opening storage device 1 described above, when the lid 20 is pressed downward in a state where the lid 20 is opened at any of the opened positions, the shaft 41c, 42c, 51c, 52c on the side where the lid 20 has been opened, is inserted in the fixing hole 13a, 14a of the box body 10, and the side portion where the lid 20 has been opened is held at the closed position. In this case, the shaft 41c, 42c, 51c, 52c is inserted in the fixing hole 13a, 14a of the box body 10 in a state where the tilted surface 103a of the leading end portion 101 has the surface height position which is lowered from the leading end toward the depth side in the axial direction, and the tilted surface 103a is disposed so as to oppose the tilted surface 112a of the hole depth portion 111 of the fixing hole 13a, 14a such that the tilted surface 103a and the tilted surface 112a are almost parallel to each other (state shown in FIG. 11). The fixing hole 13a, 14a is formed so as to have a shape larger than the shaft 41c, 42c, 51c, 52c in order to assure easy insertion and removal of the shaft 41c, 42c, 51c, 52c. Therefore, axial misalignment of the shaft 41c, 42c, 51c, 52c having been inserted occurs in the fixing hole 13a, 14a.

In a case where the lid 20 is held at the closed position as described above, the lid 20 is held so as to be pressed upward on both the left side and the right side due to an urging force by the left side urging member 63 of the left side opening operation assisting device 60, and an urging force by the right side urging member 73 of the right side opening operation assisting device 70. In this case, the shafts 41c, 42c, 51c, and 52c of the lid 20 are held so as to be inserted in upper portions in the fixing holes 13a and 14a of the box body 10 (specifically, so as to contact with the upper surfaces of the hole walls of the fixing holes 13a and 14a).

When the button portion 45a, 55a of the left side operation portion 45 or the right side operation portion 55 is pressed in such a state, the shafts 41c and 42c on the left side or the shafts 51c and 52c on the right side are removed from the fixing holes 13a and 14a, and the left side portion of the lid 20 is pressed upward due to an urging force by the left side urging member 63 of the left side opening operation assisting device 60, and is opened by pivoting the lid 20 about the shafts 51c and 52c on the right side, or the right side portion of the lid 20 is pressed upward due to an urging force by the right side urging member 73 of the right side opening operation assisting device 70, and is opened by pivoting the lid 20 about the shafts 41c and 42c on the left side. When the left side portion of the lid 20 is opened toward the fully-opened position, the right side press-holding portion 71 of the right side opening operation assisting device 70 is disposed adjacent to the left side portion of the lid 20 that is erected in the vertical direction by the left side portion being opened, whereby the lid 20 is held at the left-side fully-opened position. Meanwhile, when the right side portion of the lid 20 is opened toward the fully-opened position, the left side press-holding portion 61 of the left side opening operation assisting device 60 is disposed adjacent to the right side portion of the lid 20 that is erected in the vertical direction by the right side portion being opened, whereby the lid 20 is held at the right-side fully-opened position.

While the lid 20 is being opened toward the left-side fully-opened position or the right-side fully-opened position in this manner, both a force for pressing upward the left side portion of the lid 20 due to an urging force by the left side urging member 63, and a force for pressing upward the right side portion of the lid 20 due to an urging force by the right side urging member 73 cease. Therefore, the shafts 41c and 42c on the left side of the lid 20 or the shafts 51c and 52c on the right side of the lid 20 move downward due to gravity of the lid 20 while rotating as the rotation shafts in the fixing holes 13a and 14a of the box body 10, whereby axial misalignment of the shaft 41c, 42c, 51c, 52c is likely to occur.

Meanwhile, in the double opening storage device 1 according to the present embodiment, the shaft 41c, 42c, 51c, 52c has the leading end portion 101 structured so as to have the cut portion 103 obtained by a part of the circumferential portion being cut out, and to have a distance varying from the axis C of the body portion 100 to the outer surface around the circumference. In this structure, movement of the shaft 41c, 42c, 51c, 52c in the downward direction in the fixing hole 13a, 14a is regulated as described below when the shaft 41c, 42c, 51c, 52c rotates as the rotation shaft in the fixing hole 13a, 14a while the lid 20 is being opened toward the left-side fully-opened position or the right-side fully-opened position.

Figure 15:
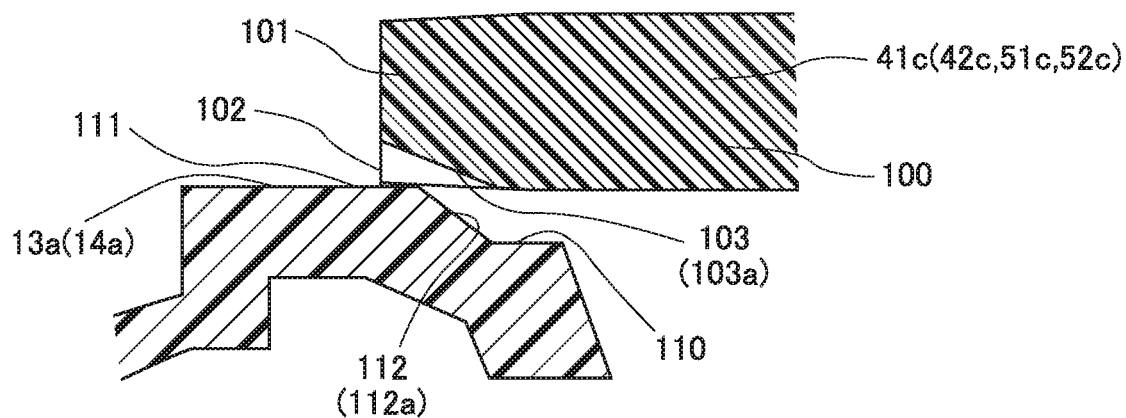
FIG. 15 is a cross-sectional view showing a positional relationship between the shaft and the fixing hole in the case of the end portion of the shaft contacting with a projection in the fixing hole due to an opening operation of the lid in the double opening storage device according to the present embodiment.
Figure 16:
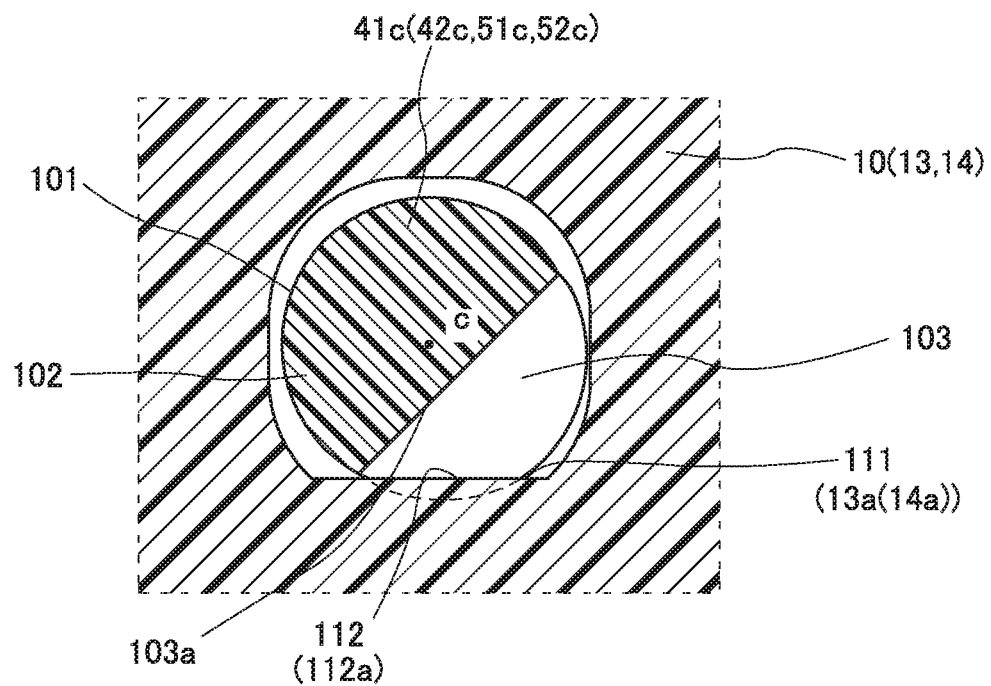
FIG. 16 is a cross-sectional view, as taken along XIV-XIV in FIG. 11, showing a positional relationship between the shaft and the fixing hole in the case of the end portion of the shaft contacting with the projection in the fixing hole due to the opening operation of the lid in the double opening storage device according to the present embodiment.
Figure 17:
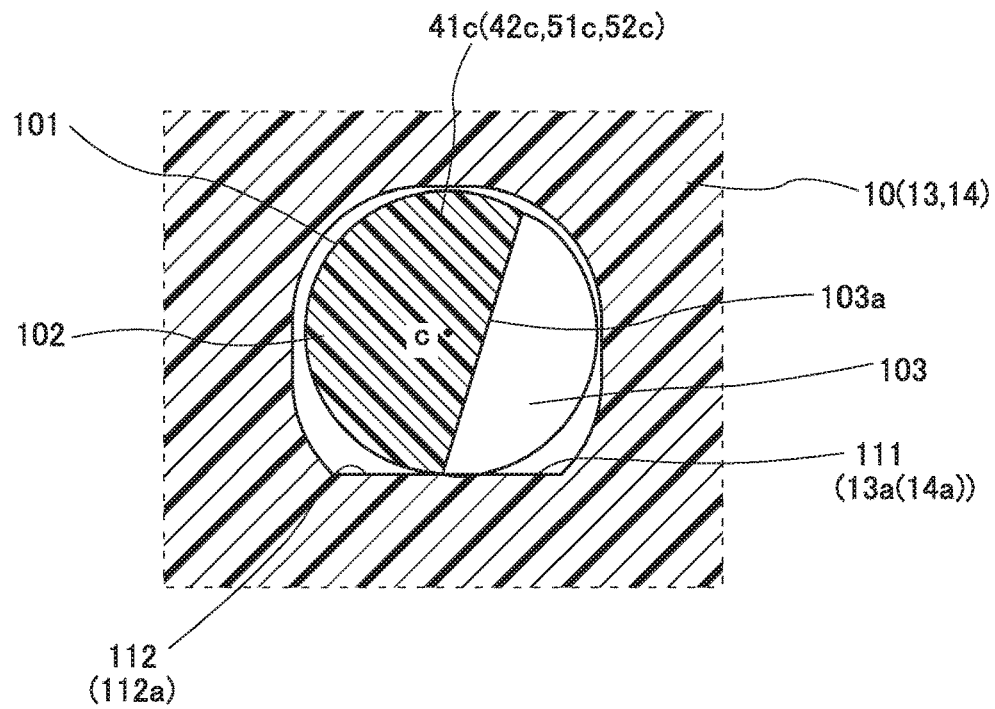
FIG. 17 is a cross-sectional view, as taken along XIV-XIV in FIG. 11, showing a state where the axis of the shaft is moved upward due to the opening operation of the lid in the double opening storage device according to the present embodiment.
Figure 18:
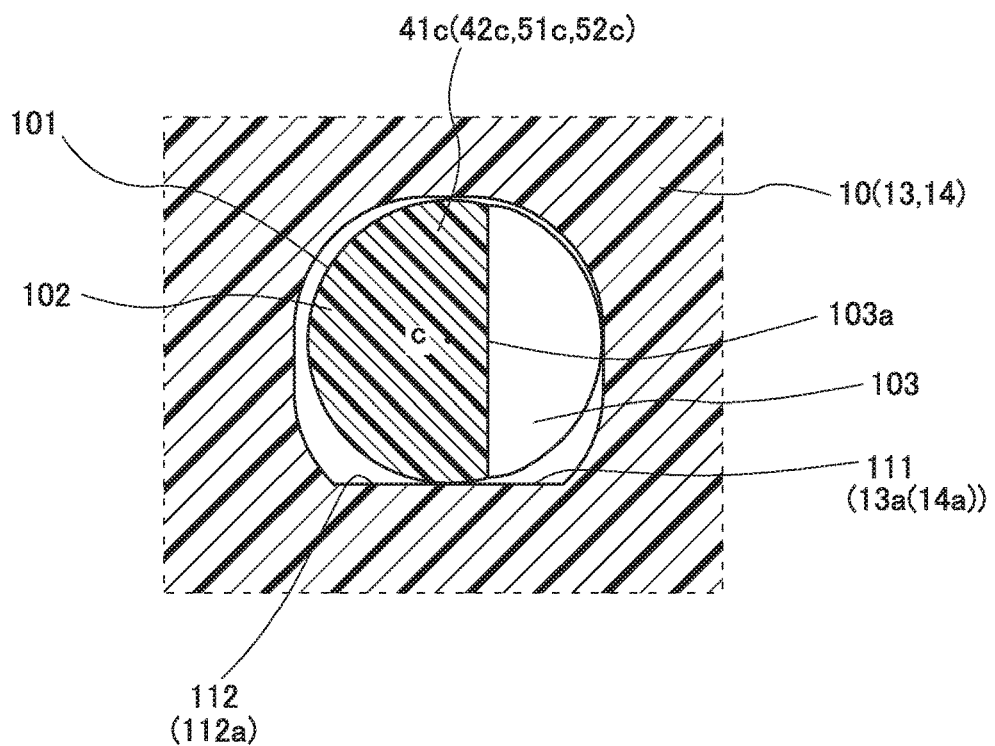
FIG. 18 is a cross-sectional view, as taken along XIV-XIV in FIG. 11, showing a positional relationship between the shaft and the fixing hole at a fully-opened position of the lid in the double opening storage device according to the present embodiment.

That is, when the shaft 41c, 42c, 51c, 52c rotates as the rotation shaft, a state shifts from a state where the tilted surface 103a of the cut portion 103 of the leading end portion 101 opposes the tilted surface 112a of the projection 112 in the hole depth portion 111 of the fixing hole 13a, 14a such that the tilted surface 103a is almost parallel to the tilted surface 112a (state shown in FIG. 14), according to the rotation, to a state where angular misalignment of the tilted surface 103a relative to the tilted surface 112a occurs, and a portion near a boundary between the non-cut portion 102 and the cut portion 103 of the leading end portion 101 contacts with the projection 112 in the fixing hole 13a, 14a (state shown in FIG. 15 and FIG. 16).

When the portion near the boundary contacts with the projection 112 in the fixing hole 13a, 14a according to the rotation of the shaft 41c, 42c, 51c, 52c, the lower surface side portion of the shaft 41c, 42c, 51c, 52c is supported in the fixing hole 13a, 14a. Therefore, after the lower surface side portion has been supported, even when a force for pressing the lid 20 upward due to an urging force by the left side urging member 63 and an urging force by the right side urging member 73 ceases while the shaft 41c, 42c, 51c, 52c is being rotated up to the fully-opened position of the lid 20, further movement of the shaft 41c, 42c, 51c, 52c in the fixing hole 13a, 14a in the downward direction is regulated.

In a case where a force for pressing the lid 20 upward due to an urging force by the left side urging member 63 and an urging force by the right side urging member 73 ceases before the portion near the boundary contacts with the projection 112 in the fixing hole 13a, 14a according to the rotation of the shaft 41c, 42c, 51c, 52c, the shaft 41c, 42c, 51c, 52c is moved downward in the fixing hole 13a, 14a due to gravity of the lid 20 (see FIG. 16). However, in this case, after the portion near the boundary in the shaft 41c, 42c, 51c, 52c contacts with the projection 112 in the fixing hole 13a, 14a, movement of the shaft 41c, 42c, 51c, 52c in the downward direction is regulated, and, thereafter, the axis C of the shaft 41c, 42c, 51c, 52c is moved upward in the fixing hole 13a, 14a according to the rotation (see FIG. 17).

The upward movement of the axis C of the shaft 41c, 42c, 51c, 52c as described above is continued from contact of the portion near the boundary in the shaft 41c, 42c, 51c, 52c with the projection 112 until contact of the outer surface of the shaft 41c, 42c, 51c, 52c with the upper surface of the hole wall of the fixing hole 13a, 14a of the box body 10. In a case where, after the contact of the portion near the boundary in the shaft 41c, 42c, 51c, 52c with the projection 112 and before contact of the outer surface of the shaft 41c, 42c, 51c, 52c with the upper surface of the hole wall of the fixing hole 13a, 14a of the box body 10, a portion where the shaft 41c, 42c, 51c, 52c contacts with the projection 112 is shifted from the portion near the boundary to the surface of the non-cut portion 102, since a distance from the axis C to the outer surface is almost the same in the non-cut portion 102, upward movement of the axis C according to the rotation of the shaft 41c, 42c, 51c, 52c is thereafter stopped. In this case, the shaft 41c, 42c, 51c, 52c is thereafter rotated at the height position of the axis C until the lid 20 reaches the fully-opened position (see FIG. 18).

In a case where, after the portion near the boundary in the shaft 41c, 42c, 51c, 52c contacts with the projection 112 and before the portion where the shaft 41c, 42c, 51c, 52c contacts with the projection 112 shifts from the portion near the boundary to the surface of the non-cut portion 102, the outer surface of the shaft 41c 42c, 51c, 52c contacts with the upper surface of the hole wall of the fixing hole 13a, 14a of the box body 10, upward movement of the axis C of the shaft 41c, 42c, 51c, 52c is regulated, and further rotation of the shaft 41c, 42c, 51c, 52c is also regulated. In this case, an angle over which the shaft 41c, 42c, 51c, 52c rotates from the start of pivoting of the lid 20 at the closed position until contact of the outer surface of the shaft 41c, 42c, 51c, 52c with the upper surface of the hole wall of the fixing hole 13a, 14a of the box body 10 corresponds to an angle from the closed position of the lid 20 to the fully-opened position of the lid 20.

Therefore, in the double opening storage device 1, while the gap S is assured between: the outer surface of the shaft 41c, 42c, 51c, 52c that is inserted into and removed from the fixing hole 13a, 14a of the box body 10 as a latch pin and also serves as a rotation shaft when the lid 20 is opened and closed; and the hole wall of the fixing hole 13a, 14a of the box body 10, axial misalignment of the shaft 41c, 42c, 51c, 52c in the fixing hole 13a, 14a is inhibited. Therefore, malfunction, due to axial misalignment of the shaft 41c, 42c, 51c, 52c, such as rubbing between the lid 20 and components around the lid 20 or backlash at the opening and closing of the lid is avoided.

The cut portion 103, of the shaft 41c, 42c, 51c, 52c, used for inhibiting axial misalignment of the shaft 41c, 42c, 51c, 52c in the fixing hole 13a, 14a, has the tilted surface 103a having the surface height position which is lowered from the leading end toward the depth side in the axial direction, at the closed position of the lid 20. Furthermore, the projection 112, in the fixing hole 13a, 14a in the box body 10, used for inhibiting the axial misalignment has the tilted surface 112a having the surface height position which is increased from the hole opening side toward the hole depth side in the axial direction.

In this structure, the shaft 41c, 42c, 51c, 52c and the fixing hole 13a, 14a are in a state where the tilted surfaces 103a and 112a oppose each other at the closed position of the lid 20. Therefore, even when the shaft 41c, 42c, 51c, 52c is inserted in the fixing hole 13a, 14a at a deviated insertion position, the shaft 41c, 42c, 51c, 52c is moved upward in the fixing hole 13a, 14a due to contact between the tilted surfaces 103a and 112a. Therefore, deviation of insertion of the shaft 41c, 42c, 51c, 52c in the fixing hole 13a, 14a is eliminated.

In the above-described embodiment, the left side opening and closing mechanism 40 and the right side opening and closing mechanism 50 correspond to "first opening and closing mechanism" and "second opening and closing mechanism" described in claims. The lower lid member 21 corresponds to "lid body" described in claims. The shaft 41c, 42c and the shaft 51c, 52c correspond to "first shaft" and "second shaft" described in claims. The fixing holes 13a and 14a correspond to "first hole" and "second hole" described in claims. The cut portion 103 corresponds to "first cut portion" and "second cut portion" described in claims. The projection 112 corresponds to "first projection" and "second projection" described in claims. The left side urging member 63 and the right side urging member 73 correspond to "upward urging member" described in claims.

In the above-described embodiment, the projection 112, in the fixing hole 13a, 14a in the box body 10, used for inhibiting axial misalignment of the shaft 41c, 42c, 51c, 52c has the tilted surface 112a having the surface height position which is increased from the hole opening side toward the hole depth side in the axial direction. However, the present invention is not limited thereto. The projection 112 may be any projection which; projects in the hole depth portion 111 of the fixing hole 13a, 14a toward the hole center side more greatly than the hole wall of the hole opening portion 110 projects; forms a reduced gap (in particular, gap in the up-down direction) between the projection 112 and the shaft 41c, 42c, 51c, 52c; and has the projecting end that contacts with the outer surface of the shaft 41c, 42c, 51c, 52c when the lid 20 is opened. For example, the projection 112 may be a projection that projects toward the hole center side from the hole wall on the hole depth side, or may be a projection which is tapered over the entire circumference from the hole opening side toward the hole depth side.

In the above-described embodiment, the lid 20 is pressed upward at the closed position of the lid 20 due to an urging force by the left side urging member 63 and an urging force by the right side urging member 73, whereby the shaft 41c, 42c, 51c, 52c on the lid 20 side is held so as to be inserted in the upper portion in the fixing hole 13a, 14a of the box body 10, and upward pressing force ceases at the opened position of the lid 20. However, a configuration where the lid 20 is pressed, at the closed position of the lid 20, in any direction due to an urging force by an urging member, whereby the shaft 41c, 42c, 51c, 52c is held so as to be inserted in a position in any direction in the fixing hole 13a, 14a of the box body 10, and the pressing force in the direction ceases at the opened position of the lid 20, may be used.

In the above-described embodiment, the cut portion 103, of the shaft 41c, 42c, 51c, 52c, used for inhibiting axial misalignment of the shaft 41c, 42c, 51c, 52c has the tilted surface 103a having the surface height position which is lowered from the leading end toward the depth side in the axial direction at the closed position of the lid 20. However, the present invention is not limited thereto. The cut portion 103 may be a cut portion obtained by a part of the circumferential portion of the leading end portion 101 of the shaft 41c, 42c, 51c, 52c being cut out, and, for example, a cam-shaped cut portion having the outer diameter gradually reduced around the circumference.

In the above-described embodiment, the lid 20 is pressed upward at the closed position of the lid 20 due to an urging force by the left side urging member 63 and an urging force by the right side urging member 73, whereby the shaft 41c, 42c, 51c, 52c on the lid 20 side is held so as to be inserted in the upper portion in the fixing hole 13a, 14a of the box body 10. However, the present invention is not limited thereto. The double opening storage device 1 that has no urging member for generating an urging force for pressing the lid 20 at the closed position of the lid 20, may be used.

The present invention is not limited to the embodiments and modifications described above, and various changes may be made without departing from the gist of the present invention.

The invention claimed is:

1. A double opening storage device comprising:
a box body including a storage portion having an opening in an upper surface;
a lid configured to cover the opening to be openable and closable;
a first opening and closing mechanism configured to open and close the lid by pivoting the lid about a first rotation shaft that extends along a peripheral edge of the opening; and
a second opening and closing mechanism configured to open and close the lid by pivoting the lid about a second rotation shaft that extends along the peripheral edge of the opening, wherein
the lid has a lid body, a first shaft that extends to advance and retract along the first rotation shaft relative to the lid body, and a second shaft that extends to advance and retract along the second rotation shaft relative to the lid body,
the box body has:
a body portion;
a first hole formed in a side wall of the body portion such that a dimension of the first hole in an up-down direction is greater than a dimension of the first shaft in the up-down direction, and the first shaft is inserted in and removed from the first hole; and
a second hole formed in the side wall of the body portion such that a dimension of the second hole in the up-down direction is greater than a dimension of the second shaft in the up-down direction, and the second shaft is inserted in and removed from the second hole,
the first opening and closing mechanism opens and closes the lid between a closed position and a first opened position by pivoting the lid about the first rotation shaft in a state where the first shaft is inserted in the first hole and the second shaft is removed from the second hole, and the second opening and closing mechanism opens and closes the lid between the closed position and a second opened position by pivoting the lid about the second rotation shaft in a state where the first shaft is removed from the first hole and the second shaft is inserted in the second hole, the first shaft has a first cut portion obtained by a part of a circumferential portion of a leading end portion being cut out, the first cut portion being disposed in a lower portion at the closed position of the lid, the second shaft has a second cut portion obtained by a part of a circumferential portion of a leading end portion being cut out, the second cut portion being disposed in a lower portion at the closed position of the lid, and the box body has:

a first projection configured to project upward from a lower surface of a hole wall of the first hole, and to move the first shaft upward in the first hole when the lid is opened from the closed position to the first opened position; and a second projection configured to project upward from a lower surface of a hole wall of the second hole, and to move the second shaft upward in the second hole when the lid is opened from the closed position to the second opened position.

2. The double opening storage device according to claim 1, wherein the first cut portion and the second cut portion each include a tilted surface having a height position lowered from a leading end toward a depth side in an axial direction, at the closed position of the lid.

3. The double opening storage device according to claim 1, wherein the first projection and the second projection each include a tilted surface having a height position increased from a hole opening side toward a hole depth side.

4. The double opening storage device according to claim 1, wherein the first opening and closing mechanism and the second opening and closing mechanism each have an upward urging member for urging the lid upward relative to the box body at the closed position of the lid.

* * * * *